(12) United States Patent
Harada

(10) Patent No.: US 11,303,774 B2
(45) Date of Patent: Apr. 12, 2022

(54) IMAGE READING DEVICE AND METHOD FOR CONTROLLING IMAGE READING DEVICE

(71) Applicant: KYOCERA Document Solutions Inc., Osaka (JP)

(72) Inventor: Hiroyuki Harada, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/285,434

(22) PCT Filed: Oct. 10, 2019

(86) PCT No.: PCT/JP2019/039956
§ 371 (c)(1),
(2) Date: Apr. 14, 2021

(87) PCT Pub. No.: WO2020/080242
PCT Pub. Date: Apr. 23, 2020

(65) Prior Publication Data
US 2021/0400160 A1    Dec. 23, 2021

(30) Foreign Application Priority Data
Oct. 19, 2018   (JP) .............................. JP2018-197306

(51) Int. Cl.
*H04N 1/04*  (2006.01)
*H04N 1/00*  (2006.01)

(52) U.S. Cl.
CPC ..... *H04N 1/00822* (2013.01); *H04N 1/00708* (2013.01); *H04N 1/00734* (2013.01); *H04N 1/00755* (2013.01); *H04N 1/00997* (2013.01)

(58) Field of Classification Search
CPC .......... H04N 1/00822; H04N 1/00708; H04N 1/00734; H04N 1/00755; H04N 1/00997
See application file for complete search history.

(56) References Cited

U.S. PATENT DOCUMENTS

| | | | |
|---|---|---|---|
| 2009/0180158 A1* | 7/2009 | Suto | G03G 15/605 358/474 |
| 2014/0092445 A1* | 4/2014 | Ishido | H04N 1/00755 358/483 |
| 2014/0192386 A1* | 7/2014 | Ishida | H04N 1/0071 358/449 |

FOREIGN PATENT DOCUMENTS

| | | |
|---|---|---|
| JP | 2001-66712 A | 3/2001 |
| JP | 2005-195785 A | 7/2005 |
| JP | 2016-127382 A | 7/2016 |
| JP | 2018-148362 A | 9/2018 |

\* cited by examiner

*Primary Examiner* — Moustapha Diaby
(74) *Attorney, Agent, or Firm* — Stein IP, LLC

(57) ABSTRACT

On the basis of first read image data obtained by reading a first face, a controller calculates a first sub scanning size, which is a size of the first face in a sub scanning direction. On the basis of second read image data obtained by reading a second face, the controller calculates a second sub scanning size, which is a size of the second face in the sub scanning direction. The controller determines the larger of the first sub-scanning size and the second sub-scanning direction size to a definitive sub scanning size, which is the size of the document in the sub scanning direction set on the document stage.

12 Claims, 13 Drawing Sheets

FIG.15

| CONDITION | HOW TO DETERMINE |
|---|---|
| WHEN DOCUMENT CONVEYER IS NOT EVEN ONCE CLOSED UP TO ANGLE SMALLER THAN PREDETERMINED ANGLE | DETERMINE SMALLER OF 1ST AND 2ND ESTIMATE SIZES TO BE 1ST MAIN SCANNING SIZE |
| WHEN DOCUMENT CONVEYER IS CLOSED UP TO ANGLE SMALLER THAN PREDETERMINED ANGLE BUT NOT COMPLETELY CLOSED | DETERMINE SMALLER OF 1ST AND 3RD ESTIMATE SIZES TO BE 1ST MAIN SCANNING SIZE |
| WHEN DOCUMENT CONVEYER IS COMPLETELY CLOSED | DETERMINE LARGER OF SMALLER OF 1ST AND 3RD ESTIMATE SIZES AND 4TH ESTIMATE SIZE TO BE 1ST MAIN SCANNING SIZE |

FIG.16

| CONDITION | HOW TO DETERMINE |
|---|---|
| WHEN DOCUMENT CONVEYER IS NOT EVEN ONCE CLOSED UP TO ANGLE SMALLER THAN PREDETERMINED ANGLE | DETERMINE SMALLER OF 5TH AND 6TH ESTIMATE SIZES TO BE 2ND MAIN SCANNING SIZE |
| WHEN DOCUMENT CONVEYER IS CLOSED UP TO ANGLE SMALLER THAN PREDETERMINED ANGLE BUT NOT COMPLETELY CLOSED | DETERMINE SMALLER OF 5TH AND 7TH ESTIMATE SIZES TO BE 2ND MAIN SCANNING SIZE |
| WHEN DOCUMENT CONVEYER IS COMPLETELY CLOSED | DETERMINE LARGER OF SMALLER OF 5TH AND 7TH ESTIMATE SIZES AND 8TH ESTIMATE SIZE TO BE 2ND MAIN SCANNING SIZE |

FIG.19

| KINDS OF ESTIMATE SIZES | TARGET | LIGHT SOURCE | READ TIME POINT |
|---|---|---|---|
| 1ST ESTIMATE SIZE | 1ST FACE | OFF | - BEFORE 1ST READ INSTRUCTION<br>- WHEN DOCUMENT CONVEYER IS OPEN WIDER THAN PREDETERMINED ANGLE |
| 2ND ESTIMATE SIZE | 1ST FACE | ON | - WHEN 1ST READ INSTRUCTION IS GIVEN |
| 3RD ESTIMATE SIZE | 1ST FACE | ON | - BEFORE 1ST READ INSTRUCTION<br>- WHEN DOCUMENT CONVEYER IS CLOSED UP TO ANGLE SMALLER THAN PREDETERMINED ANGLE |
| 4TH ESTIMATE SIZE | 1ST FACE | ON | - BEFORE 1ST READ INSTRUCTION<br>- WHEN DOCUMENT CONVEYER IS COMPLETELY CLOSED |
| 5TH ESTIMATE SIZE | 2ND FACE | OFF | - BEFORE 2ND READ INSTRUCTION<br>- WHEN DOCUMENT CONVEYER IS OPEN WIDER THAN PREDETERMINED ANGLE |
| 6TH ESTIMATE SIZE | 2ND FACE | ON | - WHEN 2ND READ INSTRUCTION IS GIVEN |
| 7TH ESTIMATE SIZE | 2ND FACE | ON | - BEFORE 2ND READ INSTRUCTION<br>- WHEN DOCUMENT CONVEYER IS CLOSED UP TO ANGLE SMALLER THAN PREDETERMINED ANGLE |
| 8TH ESTIMATE SIZE | 2ND FACE | ON | - BEFORE 2ND READ INSTRUCTION<br>- WHEN DOCUMENT CONVEYER IS COMPLETELY CLOSED |

IMAGE READING DEVICE AND METHOD FOR CONTROLLING IMAGE READING DEVICE

CROSS-REFERENCE TO RELATED APPLICATIONS

This application is a national stage of International Application No. PCT/JP2019/039956, filed Oct. 10, 2019, which claims the benefit of Japanese Application No. 2018-197306, filed Oct. 19, 2018, in the Japanese Patent Office, the disclosures of which are incorporated herein by reference.

TECHNICAL FIELD

The present disclosure relates to an image reading device which has a mode for reading a document such as a card.

BACKGROUND ART

An image reading device reads a document. A card type document such as a driver's license or an ID card may be read using the image reading device. For example, a copy of a card-type document may be attached to a request form or an application form as a proof that formalities have been carried out by the card's holder himself or herself. One example of techniques for facilitating the reading of a card-type document is described in Patent Document 1.

Specifically, described in Patent Document 1 is a document reading device including: a feeding tray on which a document is placed; a feeding portion which feeds the document; a document reading means for reading the document fed from the feeding portion; first and second discharge ports which are arranged under the feeding tray to discharge the document read by the document reading means; a first conveying passage for a flexible document through which a flexible document is conveyed and discharged via the first discharge port; and a second conveying passage for an inflexible document through which an inflexible document is conveyed and discharged via the second discharge port. The feeding tray includes a first feeding portion for feeding the flexible document to the first conveying passage and a second feeding portion for feeding the inflexible document to the second conveying passage. In this configuration, both regular paper and cards are fed from an upper tray with good visibility with the intention to permit either type of document to be read with a single reading portion (see Patent Document 1: claim 1, paragraph [0008]).

LIST OF CITATIONS

Patent Literature

Patent Document 1: Japanese Patent Application published as No. 2016-127382.

Non-Patent Literature

SUMMARY OF THE INVENTION

Problem to be Solved by the Invention

Some image reading devices have a dedicated mode for reading a special document such as a card-type document or a form. The dedicated mode is used for reading, for example, a small document used as an ID. The dedicated mode is used for reading, for example, an ID card, a credit card, a cash card, a driver's license, and a passport. Documents such as an ID card, a credit card, a cash card, a driver's license, and a passport correspond to card-type documents.

Some other image reading devices include a contact glass (platen glass) for setting a document on it. In such an image reading device, a user sets a document on the contact glass. Even during reading in the dedicated mode, the user sets a card-type document on the contact glass. The image reading device shines light toward the document. The image reading device reads the document based on reflected light.

In the dedicated mode, image data obtained by reading may be processed in accordance with the size of the document. In this case, the size of the set document is determined. The size of the card varies depending on its type. In the dedicated mode, various documents such as an ID card or a passport are set on the contact glass. Different sizes of documents are set in the dedicated mode, and thus, instead of classifying those documents into standard sizes such as A and B types in sheets, their sizes need to be accurately measured.

In order to measure the size of the set document more accurately, the size of the document may be determined using an image sensor based on image data obtained by reading. For example, the size of a document may be determined based on pixel values (density) of pixels obtained by reading. However, if the document is dark-colored, it may hamper determination of the edge of the document. Some cards such as an ID card, a credit card, or a cash card have dark-colored surfaces. When a document has a dark-colored surface, it may inconveniently be difficult to recognize the edge of the document accurately and hence to determine the size of the document accurately.

An image reading device is typically provided with a pressing plate for pressing a document. For example, a white plate is used as the pressing plate. A document like a card has a certain thickness. When light is shone to the document for reading, due to the thickness, the document casts a shadow at the edge. By detecting the position of the shadow (high-density pixels) corresponding to the edge, the size of the document may be determined. When the pressing plate is closed, in a part without a document, the pressing plate is read, and this yields white pixel values. However, when the pressing plate is open, in a part without a document, light is not reflected on the pressing plate. As a result, even pixels in a part without a document yield dark pixel values. When the document is dark-colored, there tend to be only slight differences in pixel values between in a part with the document and in a part with no document. When the pressing plate is open, it is often impossible to determine the document size accurately.

The document forming device in Patent Document 1 reads an unbendable document. However, the document forming device is not of a type in which the document is placed on a contact glass. Thus, the document forming device disclosed in Patent Document 1 cannot solve the problem mentioned above.

In view of the problems with the known techniques described above, according to the present invention, when a special document such as a card is read, the size of the document is determined accurately regardless of whether a document presser is open or closed.

Means for Solving the Problem

An image reading device according to the present invention includes an image reader, a document pressing portion, an operation panel, an image data generation circuit, and a controller. The image reader includes a document stage on which a document to be read is placed, a light source which shines light toward the document stage, and an image sensor which performs reading based on the light from the light source. The document pressing portion includes a pressing plate for pressing the document that is placed on the document stage. The document pressing portion can be opened and closed. The operation panel accepts selection of a reading mode. The image data generation circuit generates image data based on an analog image signal that is output from the image sensor. The controller, based on the image data generated by the image data generation circuit, determines the size of the document placed on the document stage. When a double-side special mode for reading both sides of a special document is selected as the reading mode, the controller, based on first read image data obtained by reading a first face, which is one side of the document, calculates a first sub scanning size, which is the size of the first face in a sub scanning direction. The controller, based on second read image data obtained by reading a second face, which is the other face of the document, calculates a second sub scanning size, which is the size of the second face in the sub scanning direction. The controller determines the larger of the calculated first and second sub scanning sizes to be a definitive sub scanning size, which is the size of the document in the sub scanning direction set on the document stage.

Advantageous Effects of the Invention

According to the present invention, it is possible, when reading a special document such as a card, to determine the size of the document accurately regardless of whether the document presser is open or closed. Even when one side of a document is dark-colored, the size of each side of the document can be determined accurately.

BRIEF DESCRIPTION OF DRAWINGS

FIG. 15 is a diagram showing one example of a method of calculating a first main scanning size according to the embodiment.

FIG. 16 is a diagram showing one example of a method of calculating a second main scanning size according to the embodiment.

FIG. 19 is a list of the features of different estimate sizes according to the embodiment.

DESCRIPTION OF EMBODIMENTS

With reference to FIGS. 1 to 19, an image reading device according an embodiment will be described below. A multifunction peripheral 100 will be taken as an example of the image reading device. The multifunction peripheral 100 can perform printing and transmission based on image data. The multifunction peripheral 100 is a kind of image forming apparatus. All the features, in terms of structure, arrangement, and the like, described in connection with the embodiment are merely examples for the sake of description, and are in no way meant to limit the scope of the invention.

(Multifunction Peripheral 100)

Figure 1:
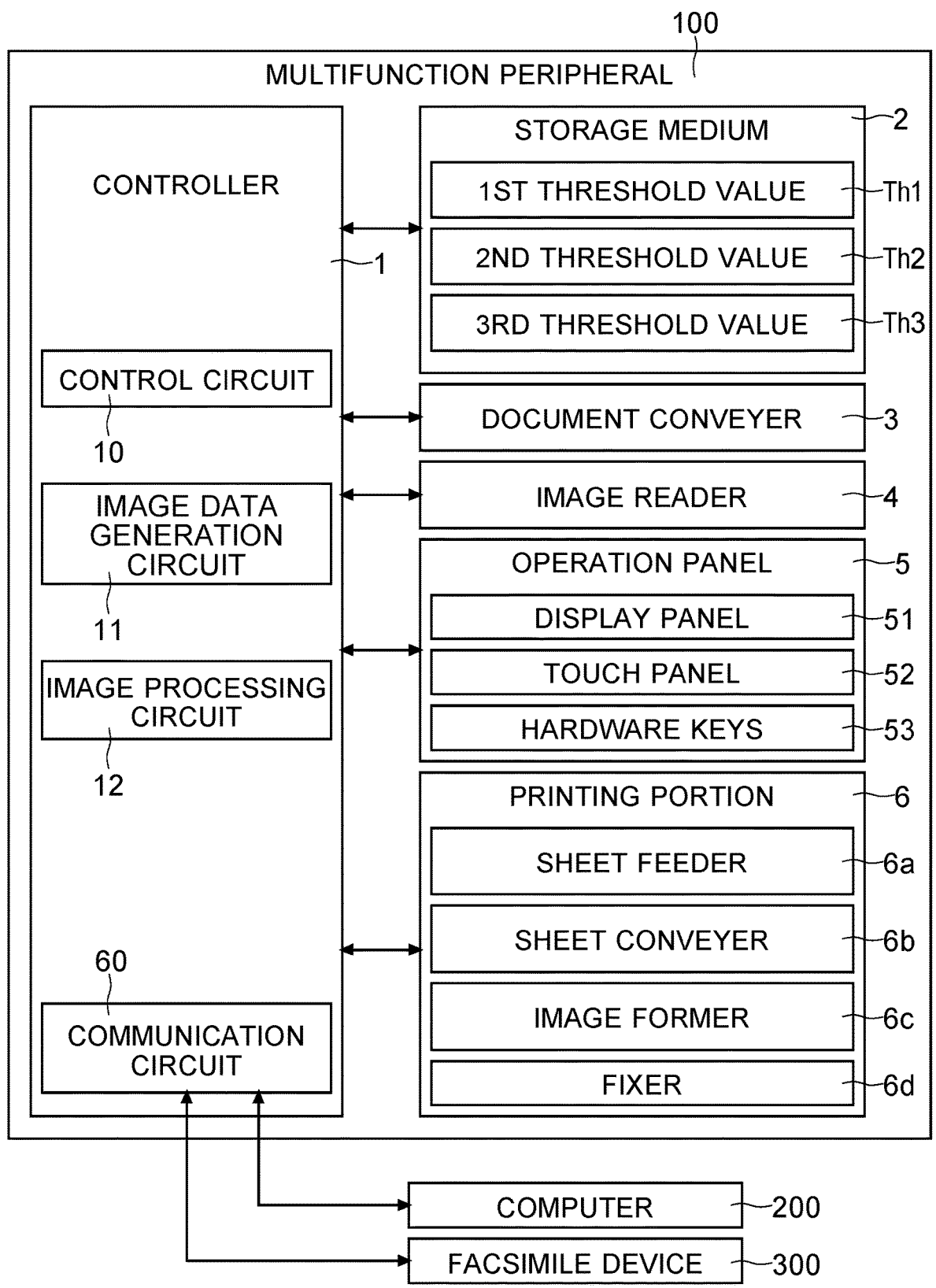
FIG. 1 is a diagram showing one example of a multifunction peripheral according to an embodiment.

With reference to FIG. 1, the multifunction peripheral 100 according to the embodiment will be described. FIG. 1 is a diagram showing one example of the multifunction peripheral 100 according to the embodiment.

As shown in FIG. 1, the multifunction peripheral 100 includes a controller 1, a storage medium 2, a document conveyer 3 (corresponding to a document pressing portion), an image reader 4, an operation panel 5, a printing portion 6 (corresponding to an output portion), and a communication circuit 60 (corresponding to an output portion).

The controller 1 controls the operation of the multifunction peripheral 100. The controller 1 controls the operation of a job such as copying and transmission. The controller 1 includes a control circuit 10, an image data generation circuit 11 (generation circuit), and an image processing circuit 12. The control circuit 10 is, for example, a CPU. The control circuit 10 performs processing and calculation related to a job. The image data generation circuit 11 processes an analog image signal that the image reader 4 outputs by reading a document, and generates image data. The image processing circuit 12 performs image processing on the image data. The storage medium 2 includes a RAM, a ROM, and a storage. The storage is, for example, an HDD or an SSD. The controller 1 controls different blocks based on the programs and data stored in the storage medium 2. The document conveyer 3 conveys a set document. The image reader 4 includes an image sensor 46 and reads a document (details will be given later).

The operation panel 5 accepts user's settings. The operation panel 5 includes a display panel 51, a touch panel 52, and hardware keys 53. The controller 1 makes the display panel 51 display messages and setting screens. The controller 1 makes the display panel 51 display operation images. The operation images include, for example, buttons, keys, and tabs. Based on the output from the touch panel 52, the controller 1 recognizes operated operation images. The hardware keys 53 include a Start key and a numeric keypad.

The touch panel 52 and hardware keys 53 accept user's setting operations (operations related to a job). For example, the operation panel 5 accepts setting of the document reading mode. Based on the output of the operation panel 5, the controller 1 recognizes what is set.

The printing portion 6 includes a sheet feeder 6a, a sheet conveyer 6b, an image former 6c, and a fixer 6d. During a printing job, the controller 1 makes the sheet feeder 6a supply a sheet. The controller 1 makes the sheet conveyer 6b convey the sheet. The sheet conveyer 6b discharges the printed sheet out of the apparatus. The controller 1 makes the image former 6c form a toner image based on the image data. The controller 1 makes the image former 6c transfer the toner image to the conveyed sheet. The controller 1 makes the fixer 6d fix the transferred toner image to the sheet.

The communication circuit 60 includes communication hardware (communication circuitry) and memory for storing communication software. The communication circuit 60 communicates with a computer 200 and a facsimile device 300. The computer 200 is, for example, a PC or a server. The operation panel 5 accepts setting of a destination. The controller 1 makes the communication circuit 60 transmit to a set destination the image data based on the read document (scanned image transmission, facsimile transmission). The communication circuit 60 receives printing data from the computer 200 and the facsimile device 300. Based on the received printing data, the controller 1 makes the printing portion 6 perform printing (a printing job, printing of a received facsimile document).

(Document Conveyer 3, Image Reader 4)

Figure 2:
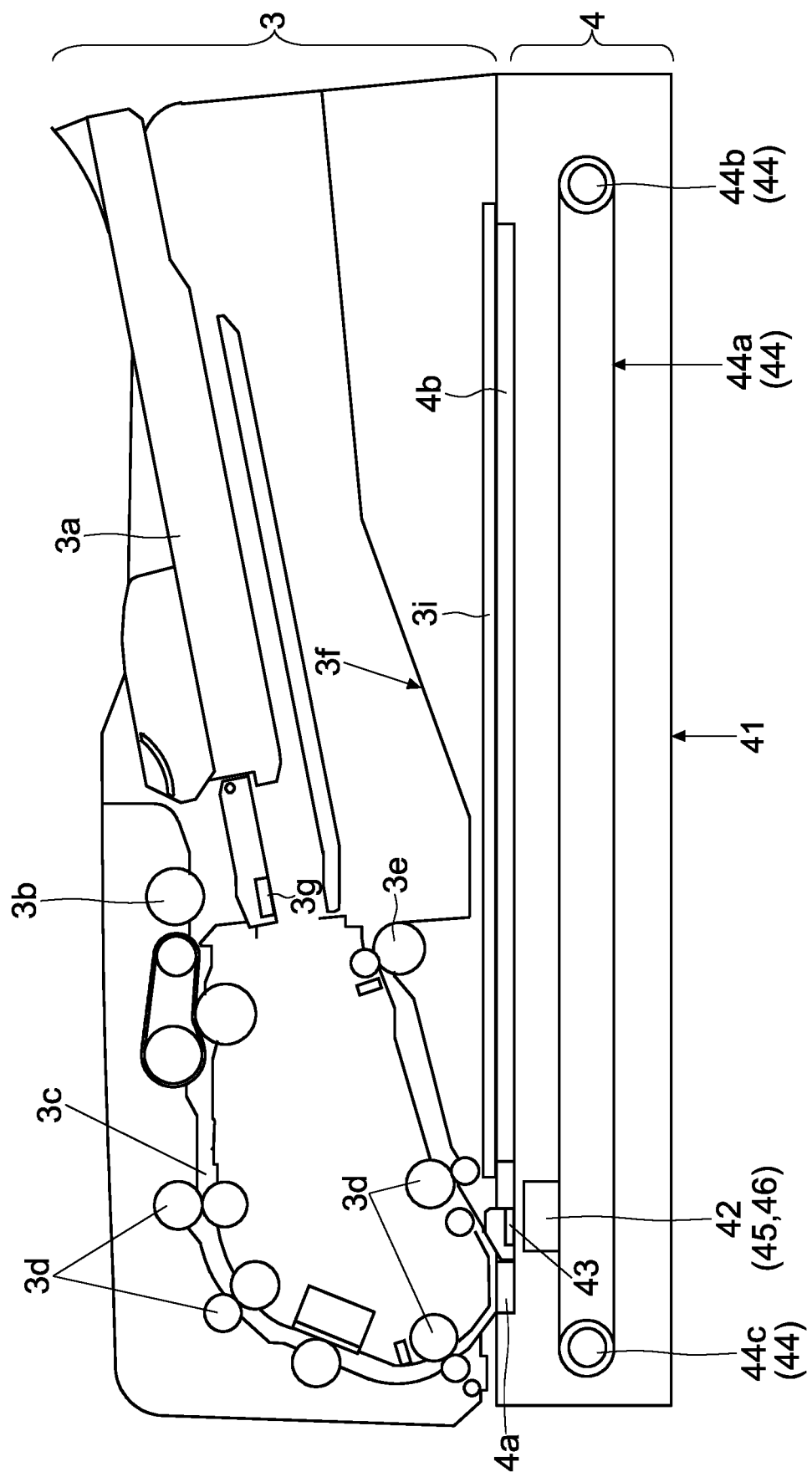
FIG. 2 is a diagram showing one example of an image reader according to the embodiment.
Figure 3:
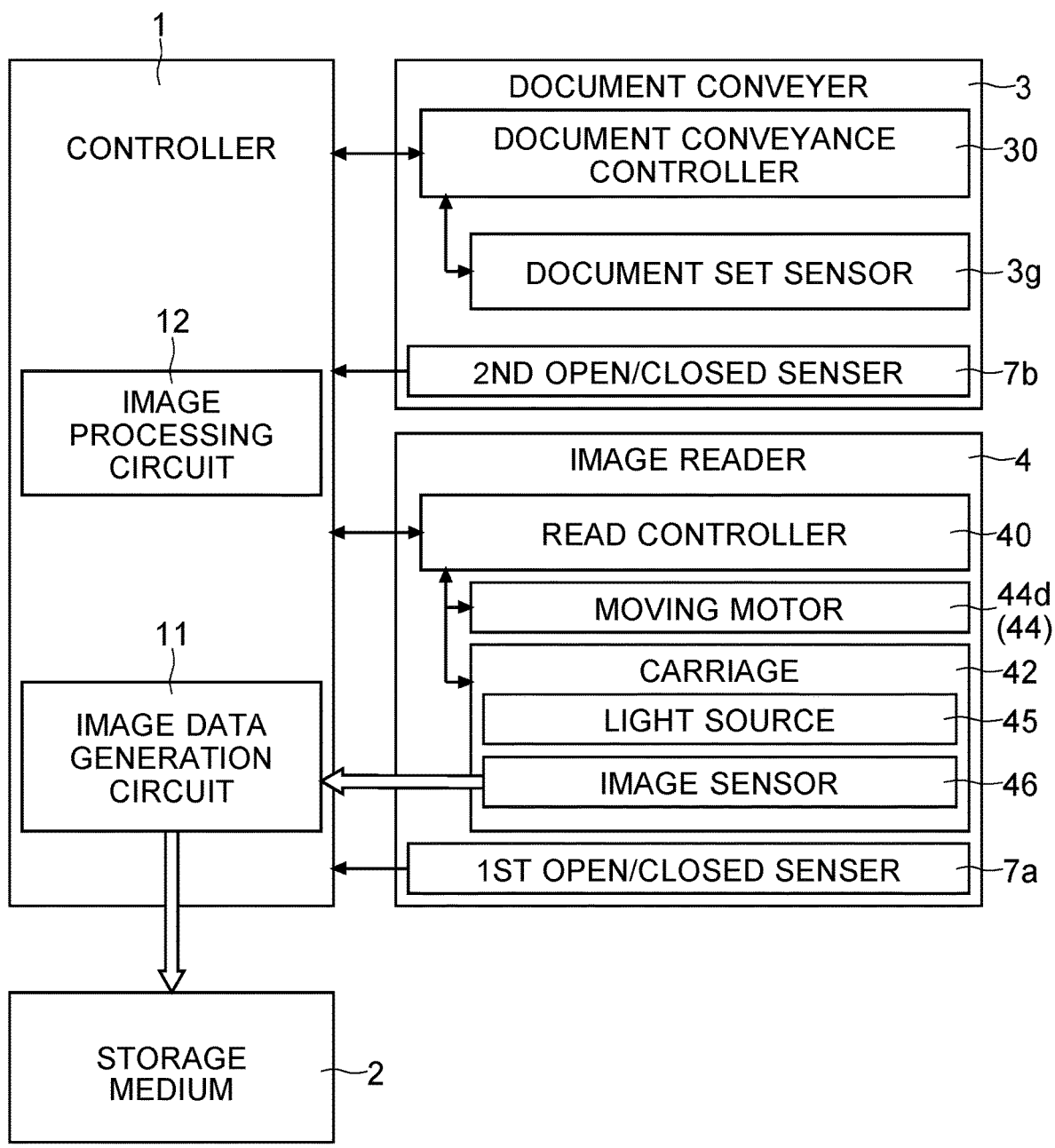
FIG. 3 is a diagram showing one example of the image reader according to the embodiment.

Next, with reference to FIGS. 2 and 3, the document conveyer 3 and the image reader 4 according to the embodiment will be described. FIGS. 2 and 3 are diagrams showing one example of the image reader 4 according to the embodiment. FIG. 2 is a diagram showing the image reader 4 according to the embodiment as seen from in front of the multifunction peripheral 100.

The document conveyer 3 conveys a set document. The document conveyer 3 is often referred to by an abbreviation, DP or ADF. When performing conveyed-document reading, a user sets a document on the document conveyer 3. The document conveyer 3 conveys one sheet after another out of the set document. The document conveyer 3 conveys the document sheet toward a conveyed-document reading contact glass 4a (reading position). The image reader 4 reads the conveyed document (conveyed-document reading).

The conveyed-document reading contact glass 4a is provided on the top face of the image reader 4. The conveyed-document reading contact glass 4a is transparent. The document conveyer 3 includes, in order from upstream in the document conveying direction, a document tray 3a, a feeding roller 3b, a document conveying passage 3c, a plurality of pairs of conveying rollers 3d, a pair of discharge rollers 3e, and a discharge tray 3f. The document sheet passes through the document conveying passage 3c. The feeding roller 3b, the plurality of pairs of conveying rollers 3d, and the pair of discharge rollers 3e convey one document sheet after another toward the discharge tray 3f. The document tray 3a is provided with a document set sensor 3g.

As shown in FIG. 3, a document conveyance controller 30 is provided in the document conveyer 3. The document conveyance controller 30 is a circuit board including a CPU and a memory. The output of the document set sensor 3g is fed to the document conveyance controller 30. Based on the output of the document set sensor 3g, the document conveyance controller 30 recognizes whether the sheet is present on the document tray 3a. The document conveyance controller 30 controls document conveyance.

Next, the image reader 4 will be described. A document stage 4b (table reading contact glass) is arranged at right on the top face of the image reader 4. The document stage 4b is a transparent plate (glass plate). When table reading is performed, a user sets a document on one face (top face) of the document stage 4b. For example, a document that cannot be conveyed is set on the document stage 4b. The document conveyer 3 can be opened and closed. FIG. 2 shows a state where the document conveyer 3 is closed.

As shown in FIG. 3, the image reader 4 includes a read controller 40. The read controller 40 is a circuit board for controlling the operation of the image reader 4. The read controller 40 is a control circuit board including a CPU and a memory. The read controller 40 receives instruction signals from the controller 1. Based on instructions, the read controller 40 controls document reading.

The image reader 4 includes in a housing 41 a carriage 42, a white reference plate 43, and a moving mechanism 44. The moving mechanism 44 includes a belt 44a, a pulley 44b, a pulley 44c, and a moving motor 44d. The carriage 42 is a scanning unit of a CIS type. The image reader 4 may have a scanning unit of a CCD type.

The belt 44a is endless. The belt 44a is stretched around the pulleys 44b and 44c. The belt 44a and the carriage 42 are connected together. The moving motor 44d is provided in the image reader 4 (see FIG. 3). The moving motor 44d rotates the pulley 44b or 44c. The moving motor 44d can rotate forward and backward. When moving the carriage 42, the read controller 40 rotates the moving motor 44d. This makes the belt 44a move around. In accordance with the rotation of the belt 44a, the carriage 42 moves in the horizontal direction (the sub scanning direction, the direction perpendicular to the main scanning direction, the left-right direction in FIG. 2). The carriage 42 moves on the other face side of (under) the document stage 4b. The white reference plate 43 is provided between the document stage 4b and the conveyed-document reading contact glass 4a.

The carriage 42 includes a light source 45 and an image sensor 46. The carriage 42 also includes a lens for directing reflected light to light-receiving elements in the image sensor 46. The light source 45 shines light toward the document stage 4b and the reading target. The light source 45 includes, for example, an LED and a light guide rod. The LED is fitted at one end or at both ends of the light guide rod. The light guide rod distributes the light received at its end evenly in the longitudinal direction (main scanning direction) of the rod. The light guide rod radiates the distributed light toward the document. For the light source 45, any light source other than an LED may be used.

The image sensor 46 reads a document that is placed on the document stage 4b or a document that is conveyed. The image sensor 46 reads the document in color. The image sensor 46 includes a plurality of light-receiving elements (photoelectric conversion elements, pixels). The light-receiving elements receive the light reflected from the reading target. The reading target is, for example, the white reference plate 43, a document, or a pressing plate 3i. The light-receiving elements are arrayed in a row. The image sensor 46 is a line sensor. The direction in which the light-receiving elements are arrayed is the main scanning direction. The light reflected from the reading target strikes the light-receiving elements. The light-receiving elements output an analog image signal in accordance with the quantity of received light (the quantity of reflected light). The larger the quantity of light received during the reading period, the larger the analog image signal that the light-receiving elements output. As described above, the image sensor 46 performs reading based on the light from the light source 45. The image sensor 46 may be of a black-and-white reading type.

The controller 1 (control circuit board) includes the image data generation circuit 11. The image sensor 46 and the image data generation circuit 11 are connected together by a cable. The analog image signal is transmitted to a remote place across the cable. Based on the analog image signal that is fed in from the image sensor 46 across the cable, the image data generation circuit 11 generates image data. The image data generation circuit 11 may be provided in the image reader 4.

The image data generation circuit 11 includes a plurality of circuits. The image data generation circuit 11 includes, for example, an amplifier circuit, an A/D conversion circuit, and a correction circuit. The amplifier circuit amplifies the analog image signal that is fed from the image sensor 46. The amplified analog image signal is fed to the A/D conversion circuit. The A/D conversion circuit converts the analog image signal fed to it into a digital image signal. That is, the A/D conversion circuit generates image data.

The generated image data is fed to the correction circuit. Due to the characteristics of the light source 45, the image sensor 46, and the image data generation circuit 11, the image data may have some distortion. The correction circuit is a circuit for correcting the distortion. For example, the correction circuit includes a shading correction circuit. The shading correction circuit performs shading correction. The correction circuit may include a correction circuit of any other type. The controller 1 makes the storage medium 2 store the image data generated and processed by the image data generation circuit 11.

(Document Setting Position and Opening/Closing of the Document Conveyer 3)

Figure 4:
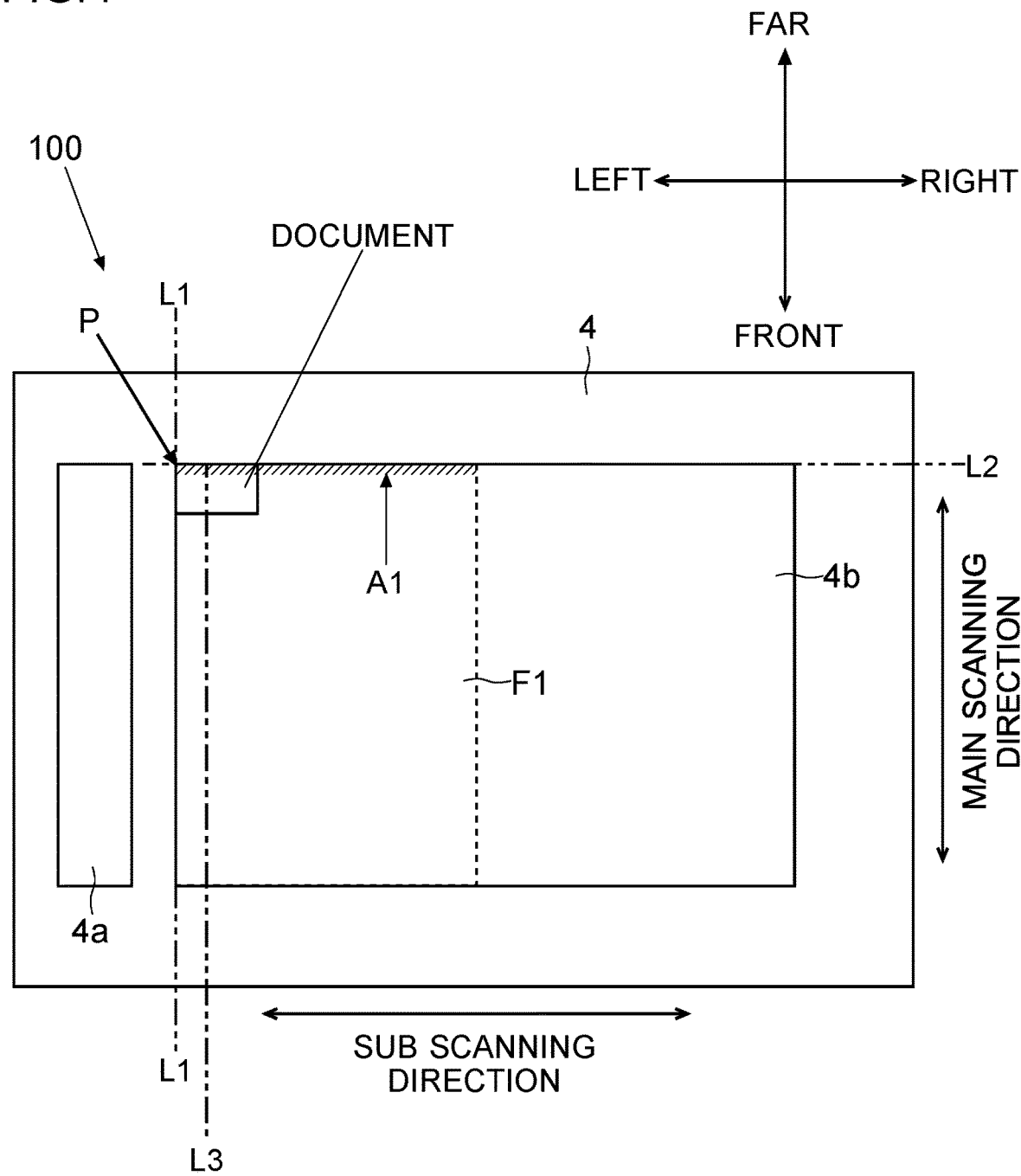
FIG. 4 is a diagram showing one example of a state where a document conveyer according to the embodiment is open.
Figure 5:
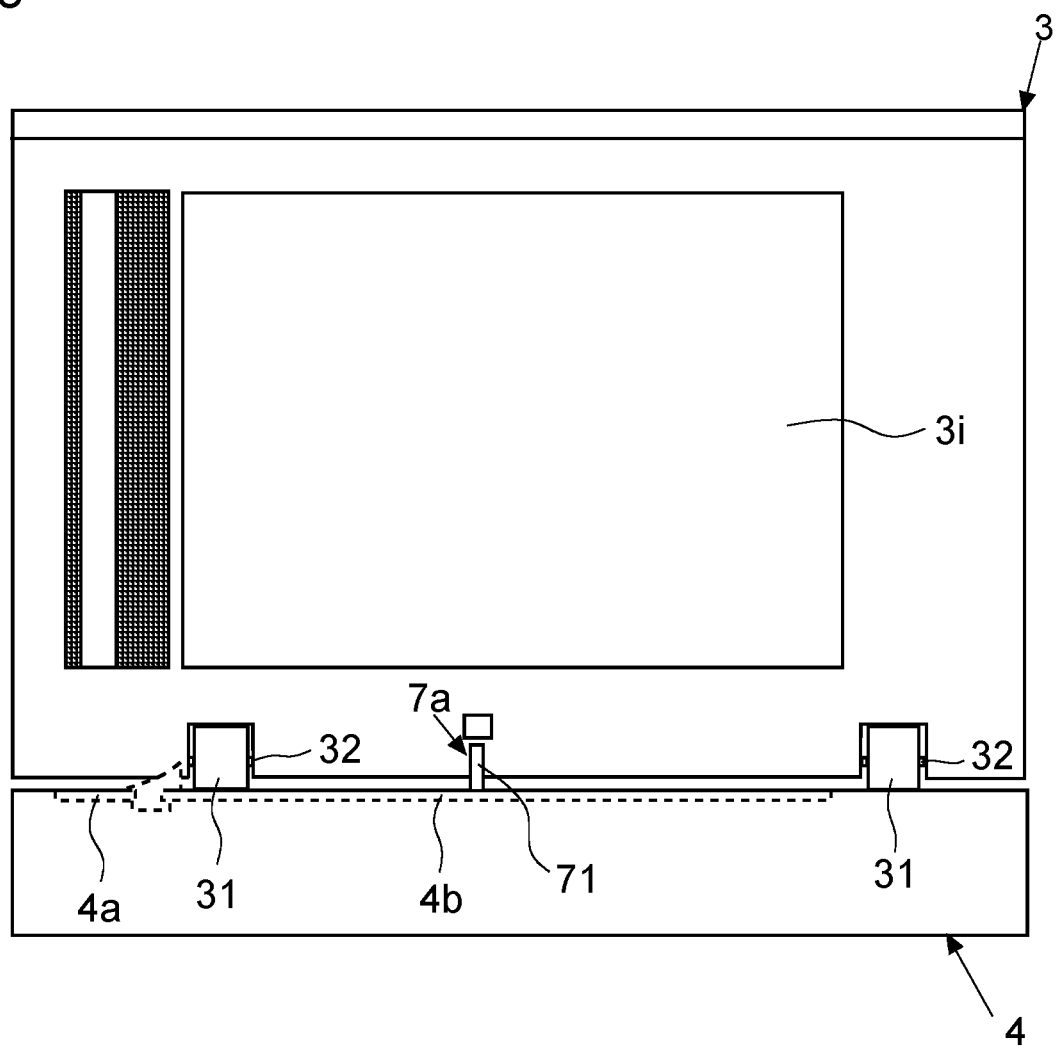
FIG. 5 is a diagram showing a state where the document conveyer according to the embodiment is open.
Figure 6:
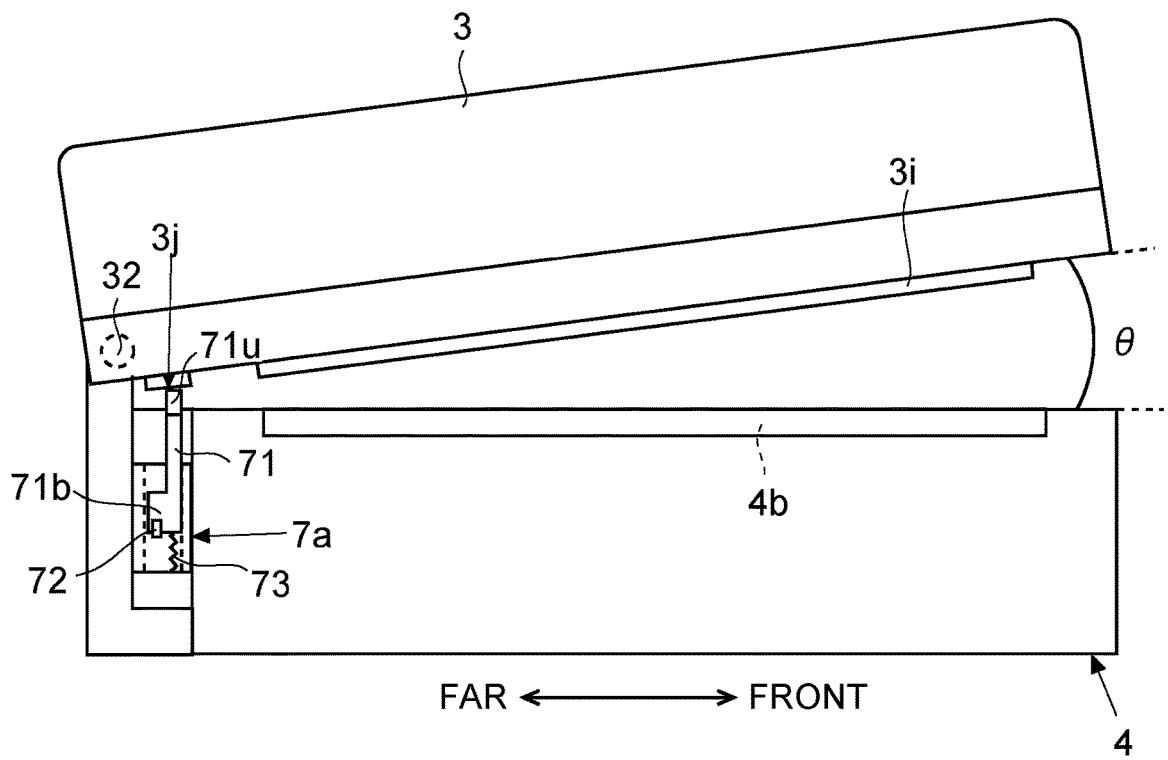
FIG. 6 is a diagram showing a state where the document conveyer according to the embodiment is open.

Next, with reference to FIGS. 3 to 6, a document setting position and opening/closing of the document conveyer 3 according to the embodiment will be described. FIG. 4 is a diagram showing one example of how a document is set on the document stage 4b according to the embodiment. FIGS. 4 to 6 are diagrams showing one example of a state where the document conveyer 3 is open.

A user places (sets) a document on the document stage 4b. The document is placed with the face to be read down. As shown in FIG. 4, a reference point P is set on the document stage 4b. The reference point P is, as seen from in front of the image reader 4 (multifunction peripheral 100), in the far left corner of the document stage 4b. When the document stage 4b is seen from above, the reference point P is in the top left corner of the document stage 4b. When placing a document, a user aligns the top left corner of the document with the reference point P.

A first reference line L1 coincides with one side of the document stage 4b that is parallel to the main scanning direction and that passes through the reference point P. The first reference line L1 is a line used as a reference when the size of the document in the sub scanning direction is determined. A second reference line L2 coincides with one side of the document stage 4b that is parallel to the sub scanning direction and that passes through the reference point P. The second reference line L2 is a line used as a reference when the size of the document in the sub scanning direction is determined.

As shown in FIG. 5, the multifunction peripheral 100 includes two hinges 31. The hinges 31 each include a rotary shaft 32. The hinges 31 (rotary shafts 32) are arranged along the far side (the rear side) of the image reader 4 (multifunction peripheral 100) as seen from in front. One leaf of the hinge 31 is fitted to the document conveyer 3. One leaf of the hinge 31 is fitted to the image reader 4. The document conveyer 3 rotates (pivots) about the rotary shafts 32. The front side of the image reader 4 (multifunction peripheral 100) is the free (i.e., unhinged) end. As the document conveyer 3 rotates, its front side swings up and down. The document conveyer 3 can be in an open or closed position with respect to the top face (document stage 4b) of the image reader 4.

To the bottom face of the document conveyer 3, the pressing plate 3i is fitted (see FIG. 2). When the document conveyer 3 is closed completely, the pressing plate 3i covers the document stage 4b from above. The pressing plate 3i is so positioned and sized as to cover the document stage 4b. When the document conveyer 3 is closed, the pressing plate 3i presses a document and the document stage 4b. The pressing plate 3i is a white plate. Instead of the document conveyer 3, a document cover plate with the pressing plate 3i fitted to its bottom face may be used. In that case, the document cover plate functions as a document presser. However, conveyed-document reading is then not possible.

As shown in FIGS. 3, 5, and 6, the image reader 4 includes a first open/closed sensor 7a. The first open/closed detection sensor 7a is arranged between the two rotary shafts 32. The first open/closed detection sensor 7a includes a contact portion 71, a transmissive optical sensor 72, and a spring 73. The spring 73 biases the contact portion 71 upward. As shown in FIG. 6, the contact portion 71 is a bar-form member that extends along the up-down direction. The contact portion 71 slides (moves) in the up-down direction in accordance with the angle θ of the document conveyer 3 (the degree of how open it is). As the document conveyer 3 is opened, the contact portion 71, biased by the spring 73, projects above the top face of the image reader 4. On the other hand, as the document conveyer 3 is closed, an upper end part 71u of the contact portion 71 makes contact with a bottom face 3j of the document conveyer 3. As the document conveyer 3 is closed further, the contact portion 71 is pushed further downward (inward of the image reader 4).

In a bottom end part of the contact portion 71, a sensor interference portion 71b is provided. The transmissive optical sensor 72 senses the sensor interference portion 71b having reached below a prescribed position. While the document conveyer 3 is closed, when the sensor interference portion 71b obstructs the optical path between a light emitting portion and a light receiving portion of the transmissive optical sensor 72, the output of the transmissive optical sensor 72 changes (to a level indicating light being intercepted). The transmissive optical sensor 72 senses the document conveyer 3 having been closed up to an angle smaller than a predetermined angle. The output of the first open/closed detection sensor 7a (transmissive optical sensor 72) is fed to the controller 1. Based on the output of the first open/closed detection sensor 7a, the controller 1 can recognize that the document conveyer 3 is open at or wider than the predetermined angle. The predetermined angle is, for example, any angle between 30 and 45 degrees.

As shown in FIG. 3, a second open/closed sensor 7b is provided within the document conveyer 3. The second open/closed detection sensor 7b is a sensor that senses the document conveyer 3 being completely closed. The second open/closed detection sensor 7b is, for example, a sensor that senses the inclination of the document conveyer 3. When the document conveyer 3 is closed, the pressing plate 3i remains horizontal. The output level of the second open/ closed detection sensor 7b changes depending on whether the document conveyer 3 is within or out of a range in which it is regarded as completely closed. The output of the second open/closed detection sensor 7b is fed to the controller 1. Based on the output of the second open/closed detection sensor 7b, the controller 1 recognizes whether the document conveyer 3 is completely closed (lowered down to the lower limit).

(Selection of Reading Mode)

Figure 7:
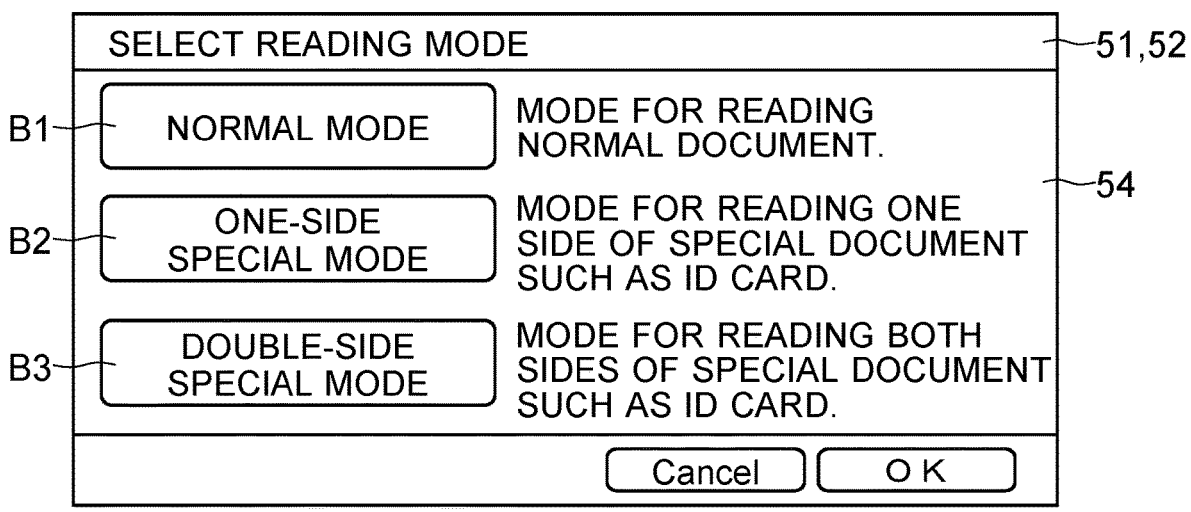
FIG. 7 is a diagram showing one example of a mode selection screen according to the embodiment.

Next, with reference to FIG. 7, one example of reading modes available on the multifunction peripheral 100 according to the embodiment will be described. FIG. 7 is a diagram showing one example of a mode selection screen 54 according to the embodiment.

On the multifunction peripheral 100, as modes for reading a document, a normal mode, a one-side special mode, and a double-side special mode are available. When a predetermined operation is performed on the operation panel 5, the controller 1 displays the mode selection screen 54 on the display panel 51. FIG. 5 shows one example of the mode selection screen 54. The operation panel 5 accepts mode selection. The multifunction peripheral 100 includes the operation panel 5 that accepts selection from among the normal mode, the one-side special mode, and the double-side special mode.

When performing reading in the normal mode, a user selects the normal mode on the operation panel 5. Specifically, the user operates a normal mode button B1. When performing reading in the one-side special mode, the user selects the one-side special mode on the operation panel 5. Specifically, the user operates a one-side special mode button B2. When performing reading in the double-side special mode, the user selects the double-side special mode on the operation panel 5. Specifically, the user operates a double-side special mode button B3. Based on the operated button, the controller 1 recognizes the mode selected on the operation panel 5.

The one-side special mode and the double-side special mode are modes for reading a special document. The special document can be, for example, any one or more of a card document, a passport, and a business card. The card document is a card-type document such as an ID card, a credit card, a cash card, a membership card, or any of various certification cards. The special document can be a document that is used as an ID such as a passport, a health insurance card, or a driver's license. The special document can be understood as a prescribed specific kind of document. As described above, the one-side special mode and the double-side special mode are modes for reading a small document such as a card (a document that fits in a card case). The one-side special mode and the double-side special mode can also be understood as modes for reading a document smaller than the minimum document size that the document conveyer 3 can convey.

In the one-side special mode and the double-side special mode, only table reading is performed. During reading in the one-side special mode or the double-side special mode, the controller 1 does not make the document conveyer 3 perform document conveying operation. In the normal mode, it is possible to perform conveyed-document reading. In the normal mode, it is also possible to perform table reading.

When reading a document in the one-side special mode or in the double-side special mode, the controller 1 makes the image reader 4 read a specific region F1 (see FIG. 4) on the document stage 4b. Cards are usually smaller than A5 size. Thus, the width of the specific region F1 in the sub scanning direction is equal to the length of the shorter or longer side of A5 size. The range of the specific region F1 in the main scanning direction is, for example, equal to the width of the document stage 4b in the main scanning direction. The controller 1 makes the image reader 4 read starting from the reference point P side of the document stage 4b. The controller 1 advances the position of the reading line in the direction away from the reference point P along the sub scanning direction.

In the one-side special mode, the controller 1 determines the document size every time the specific region F1 is read. The controller 1 (image processing circuit 12) extracts one document part (image data of the same size as the determined size) out of the batch of image data obtained by reading the specific region F1. The controller 1 generates output image data D1 in which one piece of so extracted image data is pasted on one page.

In the double-side special mode, the controller 1 determines the document size every other time the specific region F1 is read. The double-side special mode is a mode for reading both sides of a document. The controller 1 (image processing circuit 12) extracts one document part (image data of the determined size) from each of two batches of image data obtained by reading the specific region F1 twice. The controller 1 generates output image data D1 in which two pieces of so extracted image data are pasted on one page.

(Procedure for Reading in the Double-Side Special Mode)

Figure 8:
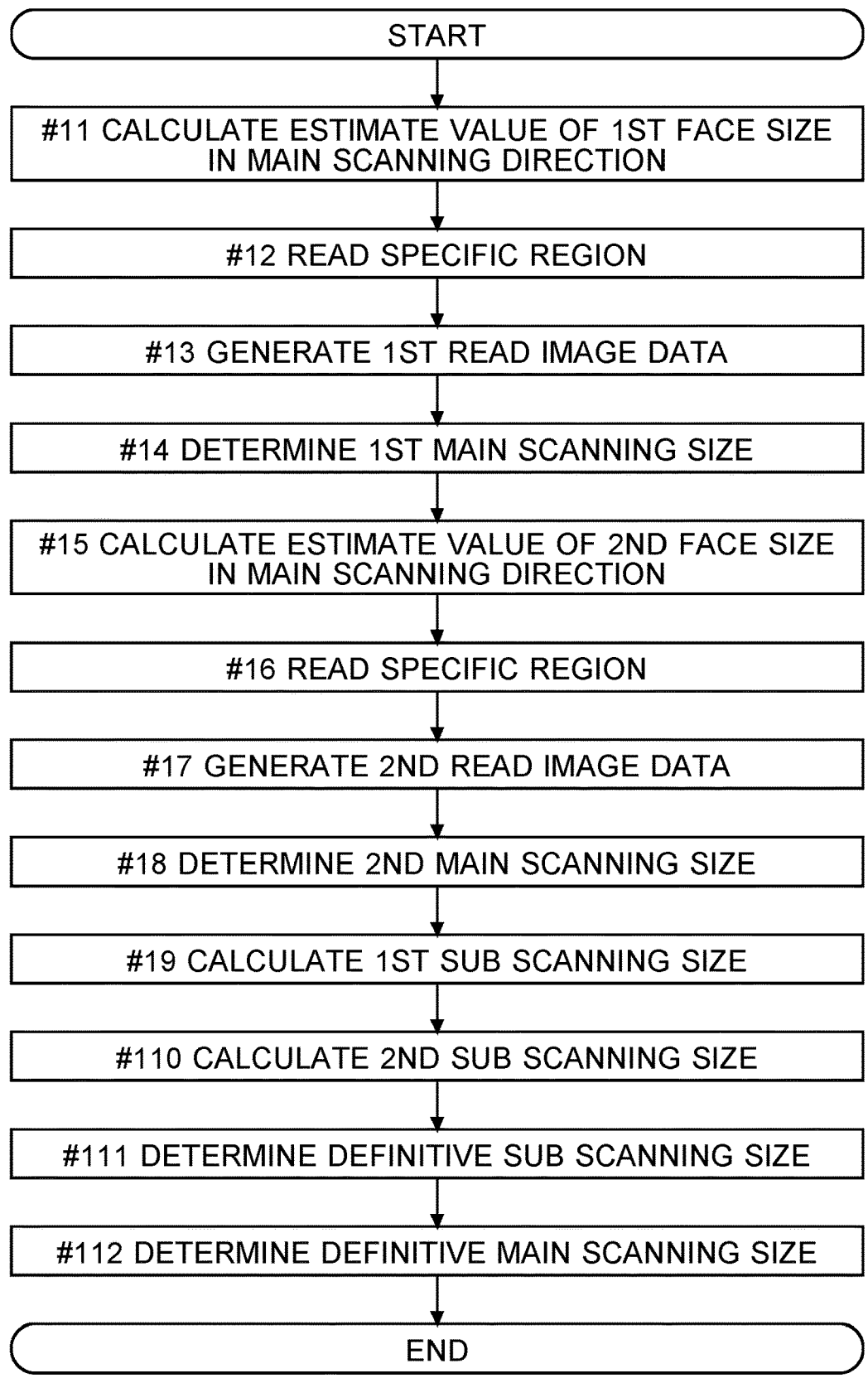
FIG. 8 is a diagram showing one example of a procedure for reading in a double-side special mode according to the embodiment.

Next, with reference to FIG. 8, one example of a procedure for reading in the double-side special mode according to the embodiment will be described. FIG. 8 is a diagram showing one example of a procedure for reading in the double-side special mode according to the embodiment.

By selecting the double-side special mode on the operation panel 5, a user can perform reading in the double-side special mode. Of a special document set on the document stage 4b, the underside is read first. One face (the first face) of the document is read first. After the entire first face is read, the user turns over the document. Then, the other face (the second face) of the document is read. The first face can be the obverse or reverse face of the document.

The procedure in FIG. 8 starts when the double-side special mode is started. In other words, it is when the double-side special mode is started for a new document. The controller 1, through reading prior to reading of the entire first face based on a first read instruction, determines an estimated value of the size of the first face of the document in the main scanning direction (step #11). The first read instruction is an instruction to start reading of the entire first face.

The operation panel 5 accepts the first read instruction. For example, the operation panel 5 accepts an operation of pressing the Start key as the first read instruction. Prior to the first read instruction (the operation of the Start key), a user places a document on the document stage 4b so as to align the top left corner of the document with the reference point P on the document stage 4b. To place a document, the user has to open the document conveyer 3. The controller 1 may, when necessary setting is complete or setting of the document is complete, make the display panel 51 display an indication that the Start key should be operated. It is possible to notify the user of the operation which the user should perform before starting reading of the first face.

Next, based on the first read instruction, the controller 1 makes the image reader 4 read the specific region F1 on the document stage 4b (step #12). Thus, the entire first face of the set document is read. The controller 1 makes the carriage 42 move in the sub scanning direction to perform reading.

The image sensor 46 outputs an analog image signal. Based on the analog image signal that is output by reading the specific region F1, the controller 1 makes the image data generation circuit 11 generate first read image data (step #13). The first read image data is image data obtained through reading of the first face of the document (first-time reading of the specific region F1). Based on the estimated value determined in step #11, the controller 1 determines the size (first main scanning size) of the first face in the main scanning direction (step #14). How the first main scanning size is determined will be described in detail later.

After the entire first face is read, the controller 1, through reading prior to reading of the entire second face based on a second read instruction, determines an estimated value of the size of the second face of the document in the main scanning direction (step #15). The second read instruction is an instruction to start reading of the entire second face. For example, the operation panel 5 accepts an operation of pressing the Start key as the second read instruction.

Prior to the second read instruction (the operation of the Start key), the user turns over the document. To turn over a document, the user has to open the document conveyer 3. Then, the user places the turned document on the document stage 4b so as to align the top left corner of the document with the reference point P on the document stage 4b. The controller 1 may, when necessary setting is complete or setting of the document is complete, make the display panel 51 display an indication that the Start key should be operated. It is possible to notify the user of the operation which the user should perform before starting reading of the second face.

Based on the second read instruction, the controller 1 makes the image reader 4 read the specific region F1 on the document stage 4b (step #16). The controller 1 makes the carriage 42 move in the sub scanning direction to perform reading. The image sensor 46 outputs an analog image signal. Based on the analog image signal output by reading the specific region F1, the controller 1 makes the image data generation circuit 11 generate second read image data (step #17). The second read image data is image data obtained through reading of the second face of the document (second-time reading of the specific region F1). Further, based on the estimated value determined in step #15, the controller 1 determines the size (second main scanning size) of the second face in the main scanning direction (step #18). How the second main scanning size is determined will be described in detail later.

Next, the controller 1 determines, based on the first read image data, a first sub scanning size which is the size of the first face in the sub scanning direction (step #19). The controller 1 also determines, based on the second read image data, a second sub scanning size which is the size of the second face in the sub scanning direction (step #110).

The controller 1 determines a definitive sub scanning size S1 (step #111). The definitive sub scanning size S1 is the size in the sub scanning direction of a document set on the document stage 4b. The controller 1 determines the larger of the first and second sub scanning sizes to be the definitive sub scanning size S1.

The controller 1, based on the determined first and second main scanning sizes, determines a definitive main scanning size S2 (step #112). The definitive main scanning size S2 is the size in the main scanning direction of a document set on the document stage 4b. The controller 1 determines the larger of the determined first and second main scanning sizes to be the definitive main scanning size S2. With step #112, the basic procedure of reading in the double-side special mode is finished (END).

(Size Determination in the Sub Scanning Direction in the Double-Side Special Mode)

Figure 9:
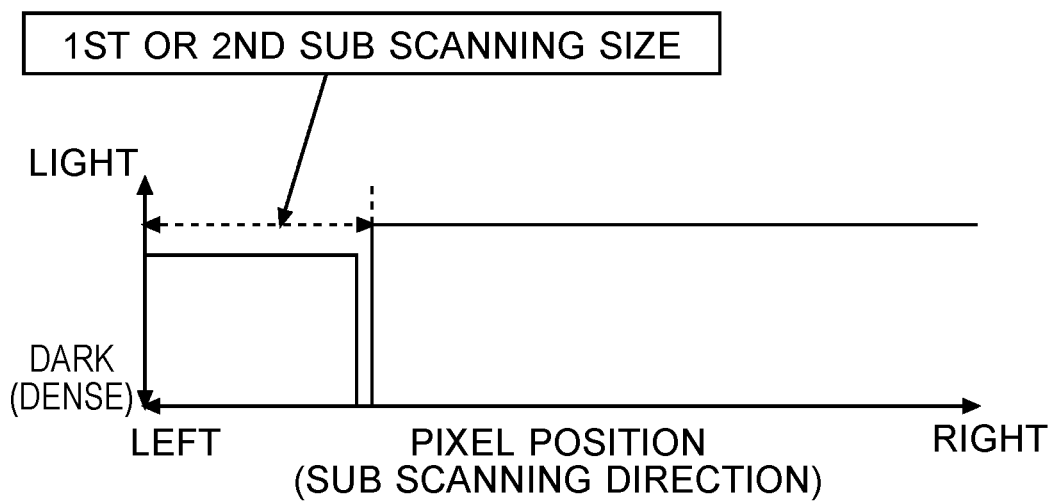
FIG. 9 is a diagram showing one example of a method of calculating a sub scanning size according to the embodiment.
Figure 10:
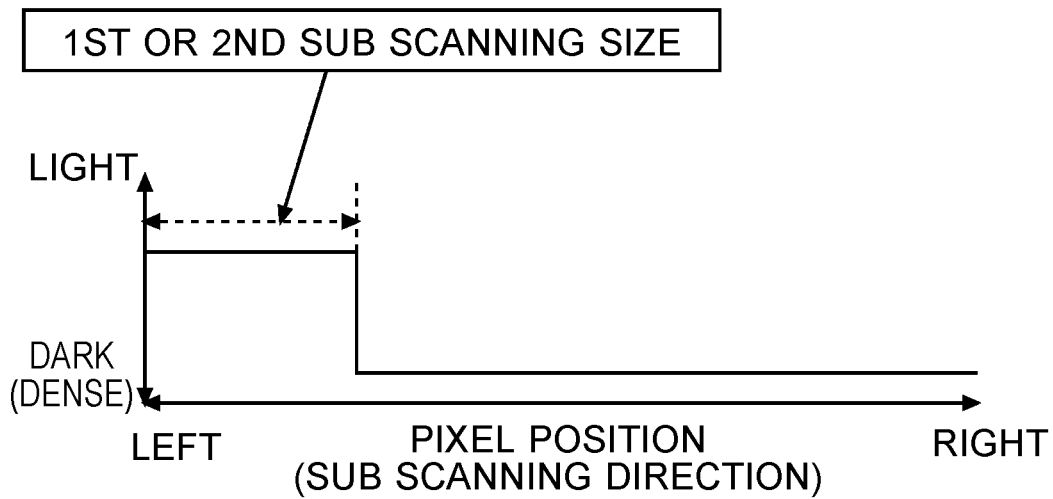
FIG. 10 is a diagram showing one example of the method of calculating the sub scanning size according to the embodiment.

Next, with reference to FIGS. 4, 6, 9, and 10, one example of a method of calculating the first and second sub scanning sizes according to the embodiment will be described. FIGS. 9 and 10 are diagrams showing one example of a method of calculating the sub scanning size according to the embodiment.

One example of a method of calculating the first and second sub scanning sizes will be described. The controller 1 determines, based on image data in a specific area, the size (first sub scanning size) of the first face of the first read image data in the sub scanning direction. The controller 1 also determines, based on the image data in the specific area, the size (second sub scanning size) of the second face of the second read image data in the sub scanning direction.

The specific area is an area that corresponds to a prescribed determining area A1 on the document stage 4b. As shown in FIG. 4, the determining area A1 is part of the specific region F1. The hatched rectangular in FIG. 4 indicates one example of the determining area A1. The determining area A1 is a strip-like region of which the longitudinal direction coincides with the sub scanning direction. The determining area A1 is an area including the far-side end (the second reference line L2) of the document stage 4b in the sub scanning direction as seen from in front of the image reader 4. The width of the determining area A1 in the main scanning direction is prescribed. For example, the width of the determining area A1 in the main scanning direction can be any value within a range between several millimeters and several centimeters. In the multifunction peripheral 100 of this embodiment, the width of the determining area A1 in the main scanning direction is about 3 mm.

An image sensor of a CIS type has larger pixels (light-receiving elements) than an image sensor of with a reduction optical system, and thus is prone to be affected by indoor light. Even with the document conveyer 3 not closed, the first and second faces of the document may be read. Pixels that receive much indoor light yield light pixel values. Using image data of pixels that receive much indoor light may result in incorrect determination of a size.

Here, as shown in FIG. 6, the rotary shaft 32 of the document pressing portion is provided along the far side of the image reader 4 as seen from in front. The closer to the far side, the smaller the distance between the document stage 4b and the document conveyer 3. The document conveyer 3 does not open so wide as to be upright. For example, when the document conveyer 3 is opened (lifted) to the maximum, the angle θ between the top face of the document stage 4b and the bottom face of the document conveyer 3 is about 60 to 80 degrees. Here, part of the document stage 4b is covered by the document conveyer 3. Lighting equipment in a room is usually provided on the ceiling. Even when the document conveyer 3 is open, less light from the ceiling reaches the part of the document stage 4b right on which the document conveyer 3 is present (the part covered by the document conveyer 3). For these reasons, less indoor light reaches the far side of the document stage 4b than the front side. Thus, based on part of image data that corresponds to an area that receives less indoor light, the controller 1 determines the sub scanning size of the document.

The width of the determining area A1 in the main scanning direction may be worked out by repeated experiments. A mode for setting the width of the determining area A1 in the main scanning direction may be made available on the multifunction peripheral 100. In this case, the operation panel 5 accepts the use of the mode. When the setting mode is selected, the controller 1 makes the image reader 4 read the document stage 4b. Here, a user keeps the document conveyer 3 open to the maximum. No document is placed on the document stage 4b.

The controller 1, for example, makes the image reader 4 read the document stage 4b a plurality of times. Then, the controller 1 recognizes the pixel values of pixels for each of a plurality of pieces of image data obtained by reading. The controller 1 further recognizes, for each piece of image data, the pixels with pixel values not lighter than a prescribed permissible value. The location of pixels which are less affected by indoor light can thus be identified. The controller 1 recognizes the distance to the pixel which is, out of the pixels that are not lighter than the permissible value, located farthest in the main scanning direction from the second reference line L2 (the line that coincides with the far side of the document stage 4b). The controller 1 takes the recognized distance as the width of the determining area A1 in the main scanning direction.

With reference to FIGS. 9 and 10, one example of a method of calculating the sub scanning size will be described. The horizontal axis in FIGS. 9 and 10 indicates the position of pixels in the sub scanning direction. The vertical axis in FIGS. 9 and 10 indicates color density (lightness) of pixels. FIG. 9 shows one example of the pixel values of the first or second read image data observed when the document conveyer 3 is closed. FIG. 10 shows one example of the pixel values of the first or second read image data observed when the document conveyer 3 is not closed. FIGS. 9 and 10 show examples of the pixel values of the first or second read image data acquired when the document has a light-colored (white) background (field).

When the document conveyer 3 is closed, the document is pressed by the pressing plate 3i. A document like a card is thick. Thus, the document casts a shadow at the edge. When the document conveyer 3 is closed, pixels that read the shadow yield dark (dense) pixel values (see FIG. 9). Here, pixels that read the pressing plate 3i yield light (white) pixel values. When the document conveyer 3 is closed, there are larger changes in pixel values at a position corresponding to the edge of the document.

When the document conveyer 3 is not closed, in a region where no document is present, the light from the light source 45 is not reflected. Pixels corresponding to the part without a document yield dark pixel values. When reading is performed with the document conveyer 3 open, pixels in the part without reflection from the pressing plate 3i have dark (dense) pixel values (see FIG. 10). Even with the document conveyer 3 not closed, larger changes in pixel values are observed at positions corresponding to the edge of the document.

The controller 1, for each pixel included in the specific area in the first read image data, calculates the absolute value of the difference in pixel values between two adjacent pixels in the sub scanning direction. The controller 1 recognizes the pixel for which the calculated absolute value of the difference is larger than the prescribed first threshold value Th1. The first threshold value Th1 is a value for recognizing, of the opposite sides of the document in the sub scanning direction, the location of the side farther from the reference point P. The storage medium 2 stores the first threshold value Th1. The controller 1 recognizes the location of, out of pixels for which the calculated absolute values are larger than the first threshold value Th1, the one located farthest from the left end of the first read image data in the sub scanning direction. The left end of the first read image data coincides with the first reference line L1 (see FIG. 4). The controller 1 counts the number of pixels up to the pixel located farthest from the left end of the first read image data in the sub scanning direction. The controller 1 calculates the first sub scanning size by multiplying the counted number of pixels with the pixel-to-pixel pitch in the sub scanning direction. The pixel-to-pixel pitch in the sub scanning direction depends on reading resolution. For example, pixels in 600 dpi have a pitch of about 42.3 μm.

The controller 1, for each pixel included in the specific area in the second read image data, calculates the absolute value of the difference in pixel values between two adjacent pixels in the sub scanning direction. The controller 1 recognizes the pixel for which the calculated absolute value is larger than the first threshold value Th1. The controller 1 recognizes the location of, out of pixels for which the absolute values of the differences are larger than the first threshold value Th1, the one that is located farthest from the left end of the second read image data in the sub scanning direction. The left end of the second read image data coincides with the first reference line L1. The controller 1 counts the number of pixels up to the pixel located farthest from the left end of the second read image data in the sub scanning direction. The controller 1 calculates the second sub scanning size by multiplying the counted number of pixels with the pixel-to-pixel pitch in the sub scanning direction.

(Size Determination in the Main Scanning Direction in the Double-Side Special Mode)

Next, with reference to FIGS. 4 and 11 to 14, one example of a method of calculating the first and second main scanning sizes according to the embodiment will be described. FIGS. 11 to 14 are diagrams showing one example of a method of calculating the main scanning size of a document according to the embodiment.

The controller 1, before reading of the entire first face (specific region F1) based on the first read instruction, performs reading at a plurality of time points (by a plurality of methods). Based on a plurality of pieces of first detection image data obtained before reading of the entire first face, an estimate value of the size of the first face in the main scanning direction is calculated. For that purpose, before reading of the entire first face, the controller 1 calculates the estimate value a plurality of times. The controller 1, after reading of the entire first face before the start of reading of the entire second face (specific region F1) based on the second read instruction, performs reading at a plurality of time points (by a plurality of methods). Based on a plurality of pieces of second detection image data obtained before reading of the entire second face, an estimate value of the size of the second face in the main scanning direction is calculated. For that purpose, the controller 1, after reading of the entire first face and before the start of reading of the entire second face based on the second read instruction, calculates the estimate value a plurality of times.

Then, the controller 1, based on the calculated estimate value of the size of the first face in the main scanning direction, calculates the first main scanning size, which is the size of the first face in the main scanning direction. The controller 1, based on the calculated estimate value of the size of the second face in the main scanning direction, calculates the second main scanning size, which is the size of the second face in the main scanning direction. The controller 1 determines the larger of the calculated first and second main scanning sizes to be the definitive main scanning size S2. The same kind of method is used for calculating the estimate value before reading of the entire first face based on the first read instruction, and after reading of the entire first face and before the start of reading of the entire second face based on the second read instruction.

Before reading of the first face (specific region F1) based on the first read instruction, and after reading of the entire first face and before the start of reading of the entire second face (specific region F1) based on the second read instruction, the controller 1 sets the position of the reading line of the image sensor 46 at a detection position L3 (see FIG. 4). The detection position L3 is prescribed. The detection position L3 is a position which is a predetermined distance away from the first reference line L1 toward the middle of the document stage 4b in the sub scanning direction. The double-side special mode is a mode used for reading a special document (card document) such as an ID card or a credit card. Thus, the predetermined distance is smaller than the width of the smallest-sized card according to one or a plurality of international standards. For example, the predetermined distance can be about several centimeters.

(First Method)

Figure 11:
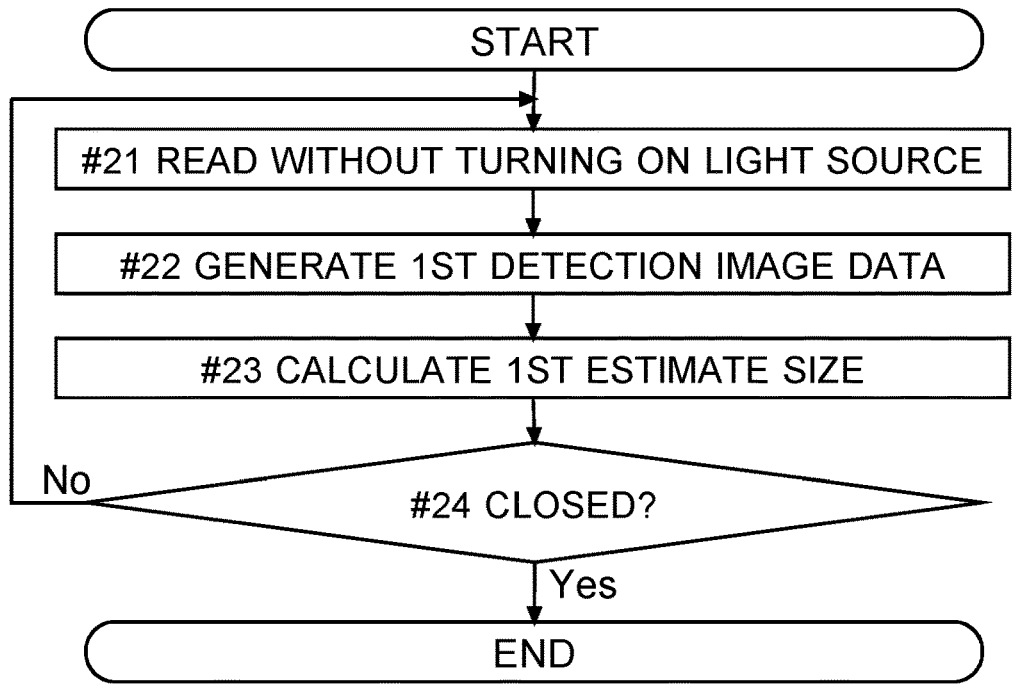
FIG. 11 is a diagram showing one example of a first method according to the embodiment.
Figure 12:
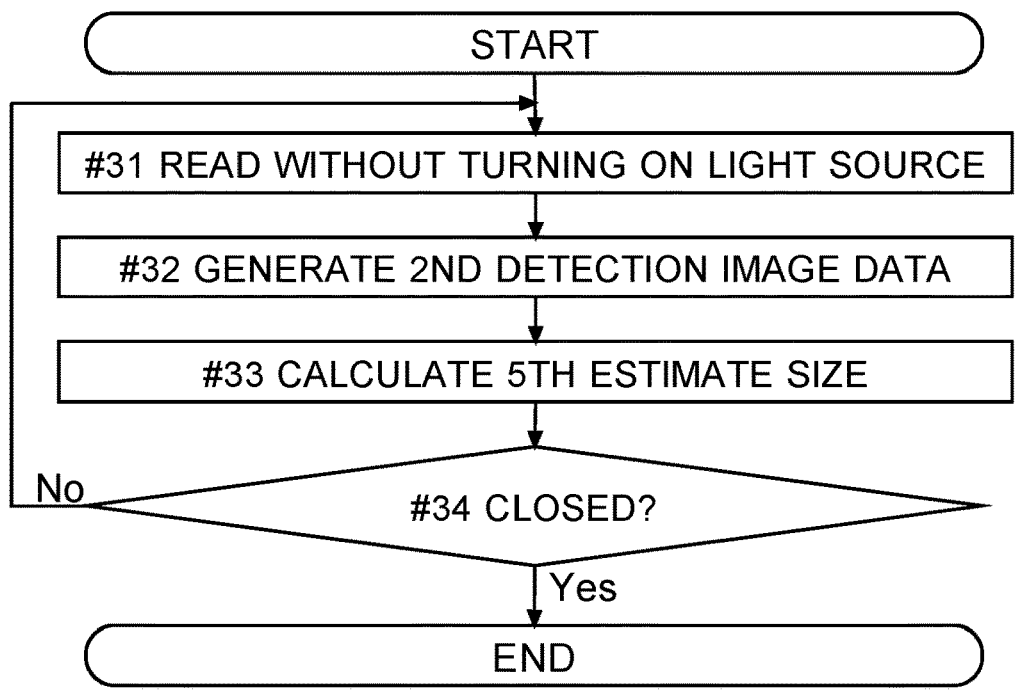
FIG. 12 is a diagram showing one example of the first method according to the embodiment.

With reference to FIGS. 11 and 12, one example of a first method of calculating an estimate value of the size of a special document in the main scanning direction will be described. FIGS. 11 and 12 show one example of the first method according to the embodiment.

The first method is a method of calculating the estimate value of the size of the document in the main scanning direction based on the result of reading under indoor light without turning on the light source 45. The procedure in FIG. 11 starts when the document conveyer 3 is opened at or wider than a predetermined angle before reading of the entire first face based on the first read instruction. Based on the output of the first open/closed sensor 7a, the controller 1 recognizes that the document conveyer 3 is open at or wider than the predetermined angle. So long as the document conveyer 3 is open at or wider than the predetermined angle, the controller 1 calculates an estimate value of the size of the first face in the main scanning direction using the first method. In the following description, the estimate size of the first face in the main scanning direction that is calculated by the first method will be referred to as a first estimate size.

The controller 1, without turning on the light source 45, makes the image reader 4 read one line (step #21). The controller 1, based on an analog image signal obtained by reading, makes the image data generation circuit 11 generate the first detection image data for the one line (step #22). The first detection image data is image data obtained by reading before reading of the entire first face based on the first read instruction. Reading of the first detection image data is triggered by the document conveyer 3 being open at or wider than a predetermined angle.

Based on the first detection image data, the controller 1 calculates the first estimate size (step #23). Here, the document prevents indoor light from entering the image sensor. When the document is set on the document stage 4b so as to be aligned with the reference point P, indoor light does not strike the pixels on the image sensor 46 in the part facing the document. Thus, the controller 1 recognizes, in the first detection image data, the pixels with the pixel values darker (denser) than a prescribed second threshold value Th2. The second threshold value Th2 is a value for recognizing, of the opposite sides of the document in the main scanning direction, the location of the side farther from the reference point P. The second threshold value Th2 can be worked out by experiments. For example, a value darker than the darkest (densest) of the pixel values of image data obtained with no document set, the document conveyer 3 open, and the light source 45 not on is taken as the second threshold value Th2. The storage medium 2 stores the second threshold value Th2.

The controller 1 recognizes, out of the pixels with pixel values darker than the second threshold value Th2, the location of the pixel located farthest from the head of the first detection image data in the main scanning direction. The head of the first detection image data is its end closer to the second reference line L2 (reference point P). The controller 1 counts the number of pixels up to the pixel located farthest from the head of the first detection image data in the main scanning direction. The controller 1 takes the value obtained by multiplying the counted number of pixels by the pixel-to-pixel pitch in the main scanning direction as the first estimate size. When there are no pixels with pixel values darker (denser) than the second threshold value Th2, the controller 1 judges that no document is placed. In this case, the controller 1 does not calculate the estimate value of the size of the first face in the main scanning direction.

Then, the controller 1 checks whether the document conveyer 3 is closed up to an angle smaller than a predetermined angle (step #24). When the document conveyer 3 is closed up to an angle smaller than the predetermined angle (Yes in step #24), the procedure ends (END). When the document conveyer 3 is not closed up to an angle smaller than the predetermined angle, the procedure returns to step #21. When the document conveyer 3 is open at or wider than the predetermined angle, the controller 1 cyclically performs reading without turning on the light source 45. The reading cycle is set so as not to coincide with the cycle of the commercial power source (the cycle of variation of indoor light). For example, a cycle which is not an integral submultiple or an integral multiple of the cycle of the commercial power source is selected.

Next, a description will be given of FIG. 12. The procedure in FIG. 12 starts when the document conveyer 3 is opened at or wider than a predetermined angle after reading of the entire first face and before the start of reading of the entire second face based on the second read instruction. Based on the output of the first open/closed sensor 7a, the controller 1 recognizes that the document conveyer 3 is open at or wider than the predetermined angle. So long as the document conveyer 3 is open at or wider than the predetermined angle, the controller 1 calculates an estimate value of the size of the second face in the main scanning direction using the first method. In the following description, the estimate size of the second face in the main scanning direction that is calculated by the first method will be referred to as a fifth estimate size.

The controller 1, without turning on the light source 45, makes the image reader 4 read one line (step #31). The controller 1, based on an analog image signal obtained by reading, makes the image data generation circuit 11 generate the second detection image data for the one line (step #32). The second detection image data is image data obtained by reading after reading of the entire first face and before the start of reading of the entire second face based on the second read instruction. Reading of the second detection image data is triggered by the document conveyer 3 being open at or wider than a predetermined angle.

Based on the second detection image data, the controller 1 calculates the fifth estimate size (step #33). The controller 1 recognizes, out of the pixels with pixel values darker than the second threshold value Th2, the location of the one located farthest from the head of the second detection image data in the main scanning direction. The controller 1 counts the number of pixels in the main scanning direction up to the pixel located farthest from the head of the second detection image data. The controller 1 takes the counted number of pixels multiplied by the pixel-to-pixel pitch in the main scanning direction as the fifth estimate size. When there are no pixels with pixel values darker (denser) than the second threshold value Th2, the controller 1 judges that no document is placed. In this case, the controller 1 does not calculate the estimate value of the size of the second face in the main scanning direction.

Then, the controller 1 checks whether the document conveyer 3 is closed up to an angle smaller than a predetermined angle (step #34). When the document conveyer 3 is closed up to an angle smaller than the predetermined angle (Yes in step #34), the procedure ends (END). When the document conveyer 3 is not closed up to an angle smaller than the predetermined angle, the procedure returns to step #31. When the document conveyer 3 is open at or wider than the predetermined angle, the controller 1 cyclically performs reading without turning on the light source 45. The reading cycle is set so as not to coincide with the cycle of the commercial power source (the cycle of variation of indoor light). For example, a cycle which is not an integral submultiple or an integral multiple of the cycle of the commercial power source is selected.

(Second Method)

Figure 13:
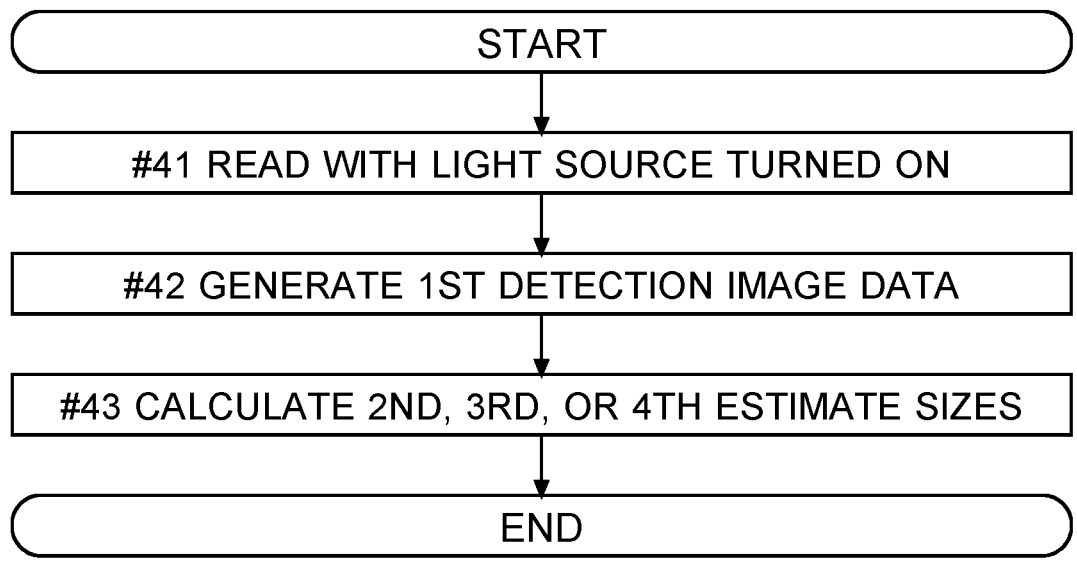
FIG. 13 is a diagram showing one example of a second method according to the embodiment.
Figure 14:
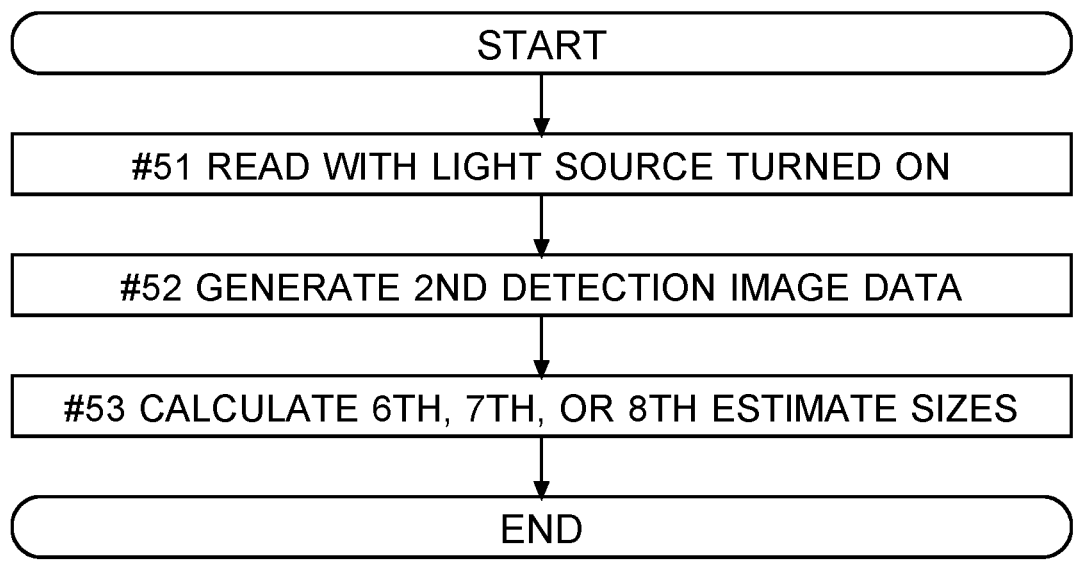
FIG. 14 is a diagram showing one example of the second method according to the embodiment.

With reference to FIGS. 13 and 14, one example of a second method of calculating an estimate value of the size of a special document in the main scanning direction will be described. FIGS. 13 and 14 show one example of the second method according to the embodiment.

The second method is a method of calculating main scanning sizes by performing reading with the light source 45 on. The procedure in FIG. 13 starts at any of the following three time points. The first time point is when the operation panel 5 accepts the first read instruction. The second time point is when the document conveyer 3 (document pressing portion) is closed up to an angle smaller than a predetermined angle. The third time point is when the document conveyer 3 is closed completely. At any of these time points, the controller 1 turns on the light source 45 to make the image reader 4 perform reading. Based on the resulting first detection image data, the controller calculates an estimate value of the size of the first face of the document in the main scanning direction.

The controller 1 turns on the light source 45 and makes the image reader 4 read one line (step #41). The image reader 4 reads the line at the detection position L3. The controller 1, based on an analog image signal obtained by reading, makes the image data generation circuit 11 generate the first detection image data for the one line (step #42). Based on the first detection image data, the controller 1 calculates an estimate value of the main scanning size of the first face (step #43).

Here, an estimate value of the size of the first face in the main scanning direction that is calculated based on the first detection image data obtained by reading at the time point when the operation panel 5 accepts the first read instruction will be referred to as a second estimate size. An estimate value of the size of the first face in the main scanning direction that is calculated based on the first detection image data obtained by reading at the time point when the document conveyer 3 (document pressing portion) is closed up to an angle smaller than a predetermined angle will be referred to as a third estimate size. An estimate value of the size of the first face in the main scanning direction that is calculated based on the first detection image data obtained by reading at the time point when the document conveyer 3 is completely closed will be referred to as a fourth estimate size.

When reading is performed before the document conveyer 3 is completely closed, the light reflected from the document strikes the pixels that face the document. Pixels in the part without a document receive no reflected light from the pressing plate 3i. Reflected light does not strike pixels in the part without a document. Pixels in the part without a document have dark (dense, black) pixel values. On the other hand, if the document is light-colored, pixels that read the document yield light (pale, white) pixel values. Thus, when reading is performed with the document conveyer 3 not completely closed, larger changes in pixel values are observed at positions corresponding to the edge of the document.

When the document conveyer 3 is completely closed, the document is pressed by the pressing plate 3i. A document like a card is thick. Thus, the document casts a shadow at the edge. When the document conveyer 3 is closed, pixels that read the shadow yield dark (dense, black) pixel values (see FIG. 9). Pixels that read the pressing plate 3i yield light (pale, white) pixel values. Even with the document conveyer 3 closed, larger changes in pixel values are observed at positions corresponding to the edge of the document.

In this way, there are larger changes in pixel values at a position corresponding to the edge of the document. The controller 1, for each pixel included in the first detection image data, calculates the absolute value of the difference in pixel values between two adjacent pixels in the main scanning direction. The controller 1 recognizes the pixel for which the calculated absolute value is larger than a prescribed first threshold value Th3. The third threshold value Th3 is a value for recognizing, of the opposite sides of the document in the main scanning direction, the location of the side farther from the reference point P. The storage medium 2 stores the third threshold value Th3. The third threshold value Th3 may be the same value as the first threshold value Th1.

The controller 1 recognizes the location of, out of pixels for which the calculated absolute values are larger than the third threshold value Th3, the one located farthest from the head of the first detection image data in the main scanning direction. The head of the first detection image data is its end closer to the second reference line L2 (reference point P). The controller 1 counts the number of pixels up to the pixel located farthest from the head of the first detection image data in the main scanning direction. The controller 1 calculates the value obtained by multiplying the counted number of pixels by the pixel-to-pixel pitch in the main scanning direction as a second, third or fourth estimate size. When there are no pixels for which the calculated absolute value exceeds the third threshold value Th3, the controller 1 judges that no document is placed. In this case, the controller 1 does not calculate the estimate value of the size of the first face in the main scanning direction.

Next, with reference to FIG. 14, one example of a procedure for calculating an estimate value of the size of the second face of a special document in the main scanning direction using the second method will be described. The procedure in FIG. 14 starts at any of the following three time points. The first time point is when the operation panel 5 accepts the second read instruction. The second time point is when the document conveyer 3 (document pressing portion) is closed up to an angle smaller than a predetermined angle after reading of the entire first face and before the start of reading of the entire second face based on the second read instruction. The third time point is when the document conveyer 3 is completely closed after reading of the entire first face and before the start of reading of the entire second face based on the second read instruction. At any of these time points, the controller 1 turns on the light source 45 to make the image reader 4 perform reading. Based on the resulting second detection image data, the controller calculates an estimate value of the size of the second face of the document in the main scanning direction.

The controller 1 turns on the light source 45 and makes the image reader 4 read one line (step #51). The image reader 4 reads the line at the detection position L3. The controller 1, based on an analog image signal obtained by reading, makes the image data generation circuit 11 generate the second detection image data for the one line (step #52). The second detection image data is image data obtained by reading after reading of the entire first face and before the start of reading of the entire second face based on the second read instruction. Based on the second detection image data, the controller 1 calculates an estimate value of the main scanning size of the second face of the document (step #53).

Here, an estimate value of the size of the second face in the main scanning direction that is calculated based on the second detection image data obtained by reading at the time point when the operation panel 5 accepts the second read instruction will be referred to as a sixth estimate size. An estimate value of the size of the second face in the main scanning direction that is calculated based on the second detection image data obtained by reading at the time point when the document conveyer 3 (document pressing portion) is closed up to an angle smaller than a predetermined angle will be referred to as a seventh estimate size. An estimate value of the size of the second face in the main scanning direction that is calculated based on the second detection image data obtained by reading at the time point when the document conveyer 3 is completely closed will be referred to as an eighth estimate size.

Also in the second detection image data, there are larger changes in pixel values at a position corresponding to the edge of the document. Thus, the controller 1, for each pixel included in the second detection image data, calculates the absolute value of the difference in pixel values between two adjacent pixels in the main scanning direction. The controller 1 recognizes the pixel for which the calculated absolute value is larger than the third threshold value Th3. The controller 1 recognizes the location of, out of pixels for which the calculated absolute values are larger than the third threshold value Th3, the one located farthest from the head of the second detection image data in the main scanning direction. The controller 1 counts the number of pixels in the main scanning direction up to the pixel located farthest from the head of the second detection image data. The controller 1 calculates the value obtained by multiplying the counted number of pixels by the pixel-to-pixel pitch in the main scanning direction as a sixth, seventh, or eighth estimate size. When there are no pixels for which the calculated absolute value exceeds the third threshold value Th3, the controller 1 judges that no document is placed. In this case, the controller 1 does not calculate the estimate value of the size of the second face in the main scanning direction.

(Determination of the First Main Scanning Size)

Next, with reference to FIGS. 15 and 19, one example of how the first main scanning size is determined according to the embodiment will be described. FIG. 15 is a diagram showing one example of a method of calculating the first main scanning size according to the embodiment. FIG. 19 is a list of the features of different estimate sizes according to the embodiment.

The controller 1 calculates (determines) the first main scanning size for the first face of a document. The controller 1 calculates (determines) the second main scanning size of the second face of the document. Then, the controller determines the larger of the first and second main scanning sizes to be the definitive main scanning size S2. Before determining the definitive main scanning size S2, the controller 1 determines the first and second main scanning sizes.

The document conveyer 3 may or may not be completely closed before the first read instruction is given. In either case, it is preferable to calculate the first main scanning size accurately. Thus, as shown in FIG. 15, after the document conveyer 3 is opened at or wider than a predetermined angle, if the document conveyer 3 is not even once closed up to an angle smaller than a predetermined angle before the first read instruction is given, the controller 1 determines the smaller of the first and second estimate sizes to be the first main scanning size. When the document conveyer 3 is kept open at or wider than a predetermined angle, the third and fourth estimate sizes cannot be acquired (see FIG. 19). Thus, the controller 1 determines the first main scanning size based on the first and second estimate sizes, which can be calculated even with the document conveyer 3 kept open at or wider than a predetermined angle.

When the document conveyer 3 that is open at or wider than a predetermined angle is closed up to an angle smaller than a predetermined angle before the first read instruction is given and then the first read instruction is given with the document conveyer 3 not completely closed, the controller determines the smaller of the first and third estimate sizes to be the first main scanning size. Unless the document conveyer 3 is completely closed, the fourth estimate size cannot be acquired. Thus, based on the first and third estimate sizes, which can be calculated even with the document conveyer 3 not completely closed, the controller 1 determines the first main scanning size (see FIG. 19).

When, after the document conveyer 3 is opened at or wider than a predetermined angle, the document conveyer 3 is completely closed before the first read instruction is given, the controller determines the larger of the smaller of the first and the third estimate sizes and the fourth estimate size to be the first main scanning size. Using the fourth estimate size, which can be acquired when the document conveyer 3 is completely closed, it is possible to determine the first main scanning size (see FIG. 19).

(Determination of the Second Main Scanning Size)

Next, with reference to FIG. 16, one example of how the second main scanning size is determined according to the embodiment will be described. FIG. 16 is a diagram showing one example of a method of calculating the second main scanning size according to the embodiment.

After the entire first face (specific region) is read and before the second read instruction is given, the document conveyer 3 may or may not be completely closed. In either case, it is preferable to calculate the second main scanning size accurately. Thus, as shown in FIG. 16, when, after reading of the entire first face, the document conveyer 3 is opened at or wider than a predetermined angle and then the document conveyer 3 is not even once closed up to an angle smaller than a predetermined angle before the second read instruction is given, the controller 1 determines the smaller of the fifth and sixth estimate sizes to be the second main scanning size. When the document conveyer 3 is kept open at or wider than a predetermined angle, the seventh and eighth estimate sizes cannot be acquired (see FIG. 19). Thus, the controller 1 determines the second main scanning size based on the fifth and sixth estimate sizes, which can be calculated even with the document conveyer 3 kept open at or wider than a predetermined angle.

When, after reading of the entire first face, the document conveyer 3 that is open at or wider than a predetermined angle is closed up to an angle smaller than a predetermined angle before the second read instruction is given and then the second read instruction is given with the document conveyer 3 not completely closed, the controller determines the smaller of the fifth and seventh estimate sizes to be the second main scanning size. Unless the document conveyer 3 is completely closed, the eighth estimate size cannot be acquired (see FIG. 19). Thus, based on the fifth and seventh estimate sizes, which can be calculated even with the document conveyer 3 not completely closed, the controller 1 determines the second main scanning size.

When, after reading of the entire first face and before the second read instruction is given, the document conveyer 3 is opened at or wider than a predetermined angle and then the document conveyer 3 is completely closed, the controller determines the larger of the smaller of the fifth and seventh estimate sizes and the eighth estimate size to be the second main scanning size. Using the eighth estimate size, which can be acquired when the document conveyer 3 is completely closed, it is possible to determine the second main scanning size (see FIG. 19).

(Output in the Double-Side Special Mode)

Figure 17:
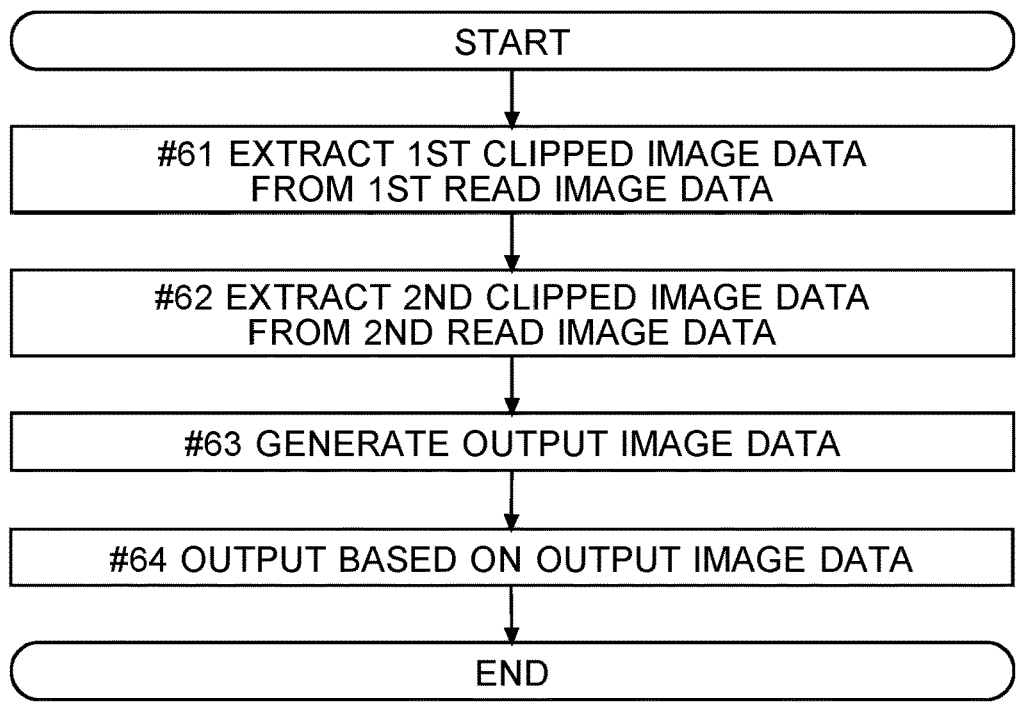
FIG. 17 is a diagram showing one example of output in the double-side special mode according to the embodiment.
Figure 18:
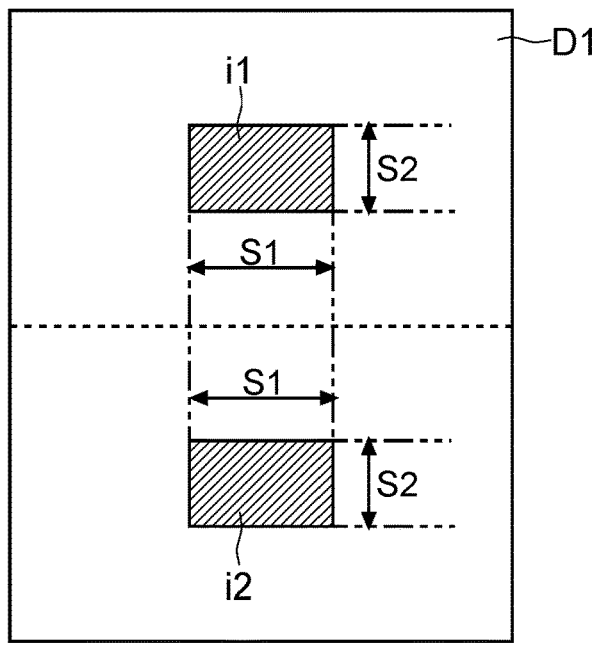
FIG. 18 is a diagram showing one example of output image data according to the embodiment.

Next, with reference to FIGS. 17 and 18, one example of an output in the double-side special mode according to the embodiment will be described. FIG. 17 is a diagram showing one example of output in the double-side special mode according to the embodiment. FIG. 18 is a diagram showing one example of output image data D1 according to the embodiment.

The multifunction peripheral 100 includes the printing portion 6 and the communication circuit 60. The printing portion 6 can perform printing based on image data obtained by reading a document. The communication circuit 60 can transmit to a set destination the image data obtained by reading the document. The printing portion 6 and the communication circuit 60 function as output portions that perform output based on image data.

In the double-side special mode, when the first read instruction is given, the controller 1 generates the first read image data. When the second read instruction is given, the controller 1 generates the second read image data. The first read image data includes the entire first face of the document. The second read image data includes the entire second face of the document. In the double-side special mode, the controller 1 processes these pieces of read image data to generate one piece of output image data D1. The output image data D1 is image data that is to be output from the printing portion 6 or the communication circuit 60.

With reference to FIG. 17, one example of a procedure for output in the double-side special mode according to the embodiment will be described. The procedure in FIG. 17 starts when determination of the definitive sub scanning size S1 and the definitive main scanning size S2 of a document is finished. First, the controller 1 extracts first clipped image data i1 from the first read image data obtained by reading the specific region F1 (step #61). The controller 1 also extracts second clipped image data i2 from the second read image data obtained by reading the specific region F1 (step #62).

The sizes of the first and second clipped image data i1 and i2 are the same both in the main and sub scanning directions (see FIG. 18). The size of the first and second clipped image data i1 and i2 in the sub scanning direction equals the determined definitive sub scanning size S1. The size of the first and second clipped image data i1 and i2 in the main scanning direction equals the determined definitive main scanning size S2.

The controller 1 extracts from the first read image data the first clipped image data i1 such that it includes the pixel corresponding to the reference point P. In this case, the controller 1 extracts the first clipped image data i1 such that the top left corner of the first read image data coincides with the top left corner of the first clipped image data i1. The controller 1 extracts from the second read image data the second clipped image data i2 such that it includes the pixel corresponding to the reference point P. In this case, the controller 1 extracts the second clipped image data i2 such that the top left corner of the second read image data coincides with the top left corner of the second clipped image data i2. The controller 1 thus clips image data such that it includes the content of the document.

Then, the controller 1 generates the output image data D1 in which the first and second clipped image data i1 and i2 are consolidated in one page (step #63). The operation panel 5 accepts setting of the size of the output image data D1. The controller 1 generates the output image data D1 with the set size.

The controller 1 first generates plain (white, blank) output image data D1. The controller 1 sets in the output image data D1 a region for the first clipped image data i1 and a region for the second clipped image data i2. The regions for the first and second clipped image data i1 and i2 have the same size. The controller 1 pastes (copies) the first clipped image data i1 in the region for the first clipped image data i1. The controller 1 pastes (copies) the second clipped image data i2 in the region for the second clipped image data i2.

FIG. 18 shows one example of the output image data D1. The controller 1 generates the output image data D1 such that it is centered. Specifically, the controller 1 pastes the first clipped image data i1 such that the center of the region for the first clipped image data i1 coincides with the center of the first clipped image data i1. Likewise, the controller 1 pastes the second clipped image data i2 such that the center of the region for the second clipped image data i2 coincides with the center of the second clipped image data i2. The pasting position is not limited to the center. Each piece of clipped image data may be pasted so as to be right- or left-aligned.

The controller 1 performs output based on the output image data D1 (step #64). The operation panel 5 accepts selection of output (the type of a job). For example, when output by printing is selected, the controller 1 makes the printing portion 6 perform printing based on the output image data D1. When output by transmission is selected, the controller 1 makes the communication circuit 60 transmit the output image data D1. The controller 1 makes the communication circuit 60 perform transmission to a destination that is set on the operation panel 5.

As described above, an image reading device (multifunction peripheral 100) according to an embodiment includes an image reader 4, a document pressing portion (document conveyer 3), an operation panel 5, an image data generation circuit 11, and a controller 1. The image reader 4 includes a document stage 4b on which a document to be read is placed, a light source 45 which shines light toward the document stage 4b, and an image sensor 46 which performs reading based on the light from the light source 45. The document pressing portion includes a pressing plate 3i for pressing the document that is placed on the document stage 4b. The document pressing portion can be opened and closed. The operation panel 5 accepts selection of a reading mode. The image data generation circuit 11 generates image data based on an analog image signal output from the image sensor 46. The controller 1, based on the image data generated by the image data generation circuit 11, determines the size of the document placed on the document stage 4b. When a double-side special mode for reading both sides of a special document is selected as the reading mode, the controller 1, based on first read image data obtained by reading a first face, which is one side of the document, calculates a first sub scanning size, which is the size of the first face in the sub scanning direction. The controller 1, based on second read image data obtained by reading a second face, which is the other face of the document, calculates a second sub scanning size, which is the size of the second face in the sub scanning direction. The controller 1 determines the larger of the calculated first and second sub scanning sizes to be a definitive sub scanning size S1, which is the size of the document in the sub scanning direction set on the document stage 4b.

When one side of a document is dark (dense)-colored, the size of the document may not be determined accurately. The size may be determined to be smaller than it actually is. In a document such as a card, it is rare that both sides are dark (dense)-colored. Even when one side of the document is dark-colored, the other side is often light (white)-colored. For example, most ID cards, credit cards, cash cards, and the like have a white background so that names or notes can be written in. According to the present invention, the larger of the first sub scanning size corresponding to the first face of the document and the second sub scanning size corresponding to the other side of the document can be taken as the size of the document in the sub scanning direction. In the double-side special mode, it is possible to accurately determine the size of each face of the document in the sub scanning direction.

When the document pressing portion is open, indoor light (external disturbance light, illumination light) strikes also the document stage 4b. Indoor light includes light from indoor lighting equipment and sunlight entering a room through a window. A document may be read with the document pressing portion open. When the rotary shaft 32 of the document pressing portion is provided along the far side of the device, the closer to the front side of the document stage 4b, the more indoor light strikes the document stage 4b. When the document pressing portion is open, the closer to the far side of the device, the smaller the distance between the document pressing portion and the document stage 4b. The closer to the far side of the document stage 4b, the less indoor light strikes the document stage 4b. When the document pressing portion is open, pixels in a part of image data without a document tend to yield darker pixel values as they are closer to the far side of the device.

In the image reading device of this embodiment, the rotary shaft 32 of the document pressing portion is provided along the far side of the image reader 4 as seen from in front. When the document pressing portion is opened and closed, its front side swings up and down. The controller 1, based on pixel values of pixels included in, of the first read image data, a specific area corresponding to a prescribed determining area A1 on the document stage 4b, calculates the first sub scanning size. The controller 1, based on pixel values of pixels included in, of the second read image data, the specific area corresponding to the determining area A1 on the document stage 4b, calculates the second sub scanning size. The determining area A1 is a strip-like region of which the longitudinal direction coincides with the sub scanning direction. The width of the determining area A1 in the main scanning direction is prescribed. The determining area A1 is an area including the far-side end of the document stage 4b in the sub scanning direction as seen from in front of the image reader 4. Based on pixel values of pixels included in, of the image data, a range corresponding to a far-side area of the device, the size in the sub scanning direction can be determined. Based on pixel values (image data) in a range where less indoor light strikes and where whether a document is present or not is easier to recognize, the size in the sub scanning direction can be determined. It is possible to accurately determine the size of each face of the document in the sub scanning direction.

When the double-side special mode is selected as the reading mode, the operation panel 5 accepts a first read instruction which is an instruction to start reading of the entire first face. The operation panel 5, after reading of the entire first face based on the first read instruction, accepts a second read instruction which is an instruction to start reading of the entire second face. The controller 1, before the start of reading of the entire first face based on the first read instruction, and after reading of the entire first face and before the second read instruction, sets a position of a reading line of the image reader 4 at a prescribed detection position L3. The controller 1, based on first detection image data obtained by reading before the start of reading of the entire first face based on the first read instruction, calculates a first main scanning size, which is the size of the first face in the main scanning direction. The controller 1, based on second detection image data obtained by reading after reading of the entire first face and before the start of reading of the entire second face, calculates a second main scanning size which is the size of the second face in the main scanning direction. The controller 1 determines the larger of the first and second main scanning sizes to be a definitive main scanning size S2, which is the size of the document in the main scanning direction set on the document stage 4b. The larger of the first main scanning size corresponding to the first face of the document and the second main scanning size corresponding to the other side of the document can be taken as the size of the document in the main scanning direction. A size incorrectly calculated as being smaller than it actually is due to the document being dark-colored is not used as the size in the main scanning direction. In the double-side special mode, it is possible to accurately determine the size of each face of the document in the main scanning direction.

The image reading device (multifunction peripheral 100) includes a first open/closed sensor 7a which senses the document pressing portion being open at or wider than a predetermined angle and which also senses the document pressing portion (document conveyer 3) having been closed up to an angle smaller than the predetermined angle. Upon recognizing, before the start of reading of the entire first face based on the first read instruction, that the document pressing portion is open at or wider than the predetermined angle based on the output of the first open/closed sensor 7a, the controller 1 makes the image reader 4 perform reading without turning on the light source 45. The controller 1, based on the first detection image data obtained by reading when the document pressing portion is open at or wider than the predetermined angle, calculates a first estimate size, which is an estimate value of the size of the first face in the main scanning direction. When the operation panel 5 accepts the first read instruction, the controller 1 makes the image reader 4 perform reading with the position of the reading line set at the detection position L3 and with the light source 45 on. The controller 1, based on the first detection image data obtained by reading when the operation panel 5 accepts the first read instruction, calculates a second estimate size, which is an estimate value of the size of the first face in the main scanning direction. When, after the document pressing portion is opened at or wider than the predetermined angle, the document pressing portion is not even once closed up to an angle smaller than the predetermined angle before the first read instruction is given, the controller 1 determines the smaller of the first and second estimate sizes to be the first main scanning size. When the first read instruction is given with the document pressing portion not even once closed, the first main scanning size can be determined by comparing the first and second estimate sizes that can be obtained. It is possible to accurately calculate the size of the first face in the main scanning direction.

The image reading device (multifunction peripheral 100) includes a second open/closed sensor 7b which senses the document pressing portion having been completely closed. Upon recognizing, before the first read instruction is given, that the document pressing portion is closed up to an angle smaller than the predetermined angle based on the output of the first open/closed sensor 7a, the controller 1 makes the image reader 4 perform reading with the light source 45 on. The controller 1, based on the first detection image data obtained by reading when the document pressing portion is closed up to an angle smaller than the predetermined angle, calculates a third estimate size, which is an estimate value of the size of the first face in the main scanning direction. When the document pressing portion is closed up to an angle smaller than the predetermined angle and then the first read instruction is given with the document pressing portion not completely closed, the controller 1 determines the smaller of the first and third estimate sizes to be the first main scanning size. When the first read instruction is given with the document pressing portion closed to a certain degree, the first main scanning size can be determined by comparing the first and third estimate sizes that can be obtained. It is possible to accurately calculate the size of the first face in the main scanning direction.

Upon recognizing, before the first read instruction is given, that the document pressing portion is completely closed based on the output of the second open/closed sensor 7b, the controller 1 makes the image reader 4 perform reading with the light source 45 on. The controller 1, based on the first detection image data obtained by reading when the document pressing portion is completely closed, calculates a fourth estimate size, which is an estimate value of the size of the first face in the main scanning direction. The controller 1 determines the larger of the smaller of the first and third estimate sizes and the fourth estimate size to be the first main scanning size. When the first read instruction is given with the document pressing portion completely closed, the first main scanning size can be determined by comparing the three estimate sizes. It is possible to calculate an accurate size of the first face in the main scanning direction.

Upon recognizing, after reading of the entire first face based on the first read instruction and before the second read instruction, that the document pressing portion is open at or wider than the predetermined angle based on the output of the first open/closed sensor 7a, the controller 1 makes the image reader 4 perform reading without turning on the light source 45. The controller 1, based on the second detection image data obtained by reading when the document pressing portion is open at or wider than the predetermined angle, calculates a fifth estimate size, which is an estimate value of the size of the second face in the main scanning direction. When the operation panel 5 accepts the second read instruction, the controller 1 makes the image reader 4 perform reading with the position of the reading line set at the detection position L3 and with the light 45 source on. The controller 1, based on the second detection image data obtained by reading when the operation panel 5 accepts the second read instruction, calculates a sixth estimate size, which is an estimate value of the size of the second face in the main scanning direction. When, after reading of the entire first face based on the first read instruction and before the second read instruction, the document pressing portion is opened at or wider than the predetermined angle and then the document pressing portion is not even once closed up to an angle smaller than the predetermined angle, the controller 1 determines the smaller of the fifth and sixth estimate sizes to be the second main scanning size. When the second read instruction is given with the document pressing portion not even once closed, the second main scanning size can be determined by comparing the fifth and sixth estimate sizes that can be obtained. It is possible to calculate an accurate size of the second face in the main scanning direction.

Upon recognizing, after reading of the entire first face based on the first read instruction, that the document pressing portion is closed up to an angle smaller than the predetermined angle based on the output of the first open/closed sensor 7a before the second read instruction is given, the controller 1 makes the image reader 4 perform reading with the light source 45 on. The controller 1, based on the second detection image data obtained by reading when the document pressing portion is closed up to an angle smaller than the predetermined angle, calculates a seventh estimate size, which is an estimate value of the size of the second face in the main scanning direction. When the document pressing portion is closed up to an angle smaller than the predetermined angle and then the second read instruction is given with the document pressing portion not completely closed, the controller 1 determines the smaller of the fifth and seventh estimate sizes to be the second main scanning size.

Upon recognizing, after reading of the entire first face based on the first read instruction and before the second read instruction, that the document pressing portion is completely closed based on the output of the second open/closed sensor 7b, the controller 1 makes the image reader 4 perform reading with the light source 45 on. The controller 1, based on the second detection image data obtained by reading when the document pressing portion is completely closed, calculates an eighth estimate size, which is an estimate value of the size of the second face in the main scanning direction. The controller 1 determines the larger of the smaller of the fifth and seventh estimate sizes and the eighth estimate size to be the second main scanning size. When the second read instruction is given with the document pressing portion completely closed, the second main scanning size can be determined by comparing the three estimate sizes. It is possible to calculate an accurate size of the second face in the main scanning direction.

The image reading device includes an output portion that performs output based on output image data D1. When reading the entire first face based on the first read instruction, the controller 1 makes the image reader 4 read a specific region F1 on the document stage 4b. The controller 1 extracts first clipped image data i1 from the first read image data obtained by reading the specific region F1. When reading the entire second face based on the second read instruction, the controller 1 makes the image reader 4 read the specific region F1. The controller 1 extracts second clipped image data i2 from the second read image data obtained by reading the specific region F1. The controller 1 generates the output image data D1 in which the first and second clipped image data i1 and i2 are consolidated in one page. The controller 1 makes an output portion perform output based on the output image data D1. The size of the first and second clipped image data i1 and i2 in the sub scanning direction equals the determined definitive sub scanning size S1. The size of the first and second clipped image data i1 and i2 in the main scanning direction equals the determined definitive main scanning size S2. It is possible to extract the document part from the first and second read image data. An accurate document size is determined, and thus the content of the document can be appropriately extracted from read image data. No part of the content of the document is lost during clipping. Also, no unnecessary part is clipped. Furthermore, it is possible to generate image data in which extracted parts are consolidated in one page. It is possible to obtain output result in which the content of the first and second faces of the document is consolidated.

The controller 1 extracts from the first read image data the first clipped image data i1 such that it includes the pixel corresponding to the reference point P on the document stage 4b. The controller 1 extracts from the second read image data the second clipped image data i2 such that it includes the pixel corresponding to the reference point P on the document stage 4b. The reference point P is, as seen from in front of the image reader 4, at a far left corner of the document stage 4b. It is possible to extract the document part from the first and second read image data with the document aligned with the reference point P on the document stage 4b. It is possible to properly extract the document part from each piece of read image data.

The description given above of an embodiment of the present disclosure is in no way meant to limit the scope of the present disclosure; the present disclosure can be implemented with any modifications made without departing from the spirit of the present disclosure.

INDUSTRIAL APPLICABILITY

The present invention is applicable to image reading devices (image forming apparatuses).

The invention claimed is:

1. An image reading device, comprising:
an image reader including
a document stage on which a document to be read is placed,
a light source which shines light toward the document stage, and
an image sensor which performs reading based on the light from the light source;
an openable/closable document pressing portion including a pressing plate for pressing the document placed on the document stage;
an operation panel which accepts selection of a reading mode;
an image data generation circuit which generates image data based on an analog image signal output from the image sensor; and
a controller which, based on the image data generated by the image data generation circuit, determines a size of the document placed on the document stage,
wherein
when a double-side special mode for reading both sides of a special document is selected as the reading mode,
the controller
based on first read image data obtained by reading a first face, which is one side of the document, calculates a first sub scanning size, which is a size of the first face in a sub scanning direction,
based on second read image data obtained by reading a second face, which is another face of the document, calculates a second sub scanning size, which is a size of the second face in the sub scanning direction, and
determines the larger of the calculated first and second sub scanning sizes to be a definitive sub scanning size, which is the size of the document in the sub scanning direction set on the document stage.

2. The image reading device according to claim 1, wherein
a rotary shaft of the document pressing portion is provided along a far side of the image reader as seen from in front,
when the document pressing portion is opened and closed, a front side thereof swings up and down,
the controller,
based on pixel values of pixels included in, of the first read image data, a specific area corresponding to a prescribed determining area on the document stage, calculates the first sub scanning size, and
based on pixel values of pixels included in, of the second read image data, the specific area corresponding to the determining area on the document stage, calculates the second sub scanning size, and
the determining area
is a strip-like region of which a longitudinal direction coincides with the sub scanning direction,
is prescribed in terms of a width thereof in a main scanning direction, and
is an area including a far-side end of the document stage in the sub scanning direction as seen from in front of the image reader.

3. The image reading device according to claim 1, wherein
when the double-side special mode is selected as the reading mode,
the operation panel
accepts a first read instruction which is an instruction to start reading of the entire first face, and
after reading of the entire first face based on the first read instruction, accepts a second read instruction which is an instruction to start reading of the entire second face, and
the controller
before start of reading of the entire first face based on the first read instruction, and after reading of the entire first face and before the second read instruction, sets a position of a reading line of the image reader at a prescribed detection position,
based on first detection image data obtained by reading before the start of reading of the entire first face based on the first read instruction, calculates a first main scanning size, which is the size of the first face in the main scanning direction,
based on second detection image data obtained by reading after reading of the entire first face and before the start of reading of the entire second face, calculates a second main scanning size which is the size of the second face in the main scanning direction, and
determines the larger of the first and second main scanning sizes to be a definitive main scanning size, which is the size of the document in the main scanning direction set on the document stage.

4. The image reading device according to claim 3, further comprising a first open/closed sensor which senses
the document pressing portion being open at or wider than a predetermined angle, and
the document pressing portion having been closed up to an angle smaller than the predetermined angle,
wherein
the controller
upon recognizing, before the start of reading of the entire first face based on the first read instruction, that the document pressing portion is open at or wider than the predetermined angle based on an output of the first open/closed sensor, makes the image reader perform reading without turning on the light source,
based on the first detection image data obtained by reading when the document pressing portion is open at or wider than the predetermined angle, calculates a first estimate size, which is an estimate value of the size of the first face in the main scanning direction,
when the operation panel accepts the first read instruction, makes the image reader perform reading with the position of the reading line set at the detection position and with the light source on,
based on the first detection image data obtained by reading when the operation panel accepts the first read instruction, calculates a second estimate size, which is an estimate value of the size of the first face in the main scanning direction, and
when, after the document pressing portion is opened at or wider than the predetermined angle, the document pressing portion is not even once closed up to an angle smaller than the predetermined angle before the first read instruction is given and then the first read instruction is given, determines the smaller of the first and second estimate sizes to be the first main scanning size.

5. The image reading device according to claim 4, further comprising a second open/closed sensor which senses the document pressing portion having been completely closed,
wherein
the controller
upon recognizing, before the first read instruction is given, that the document pressing portion is closed up to an angle smaller than the predetermined angle based on the output of the first open/closed sensor, makes the image reader perform reading with the light source on,
based on the first detection image data obtained by reading when the document pressing portion is closed up to an angle smaller than the predetermined angle, calculates a third estimate size, which is an estimate value of the size of the first face in the main scanning direction, and
when the document pressing portion is closed up to an angle smaller than the predetermined angle and then the first read instruction is given with the document pressing portion not completely closed, determines the smaller of the first and third estimate sizes to be the first main scanning size.

6. The image reading device according to claim 5, wherein
the controller
upon recognizing, before the first read instruction is given, that the document pressing portion is completely closed based on the output of the second open/closed sensor, makes the image reader perform reading with the light source on,
based on the first detection image data obtained by reading when the document pressing portion is completely closed, calculates a fourth estimate size, which is an estimate value of the size of the first face in the main scanning direction, and
determines the larger of the fourth estimate size and the smaller of the first and third estimate sizes to be the first main scanning size.

7. The image reading device according to claim 3, further comprising a first open/closed sensor which senses
the document pressing portion being open at or wider than the predetermined angle, and
the document pressing portion having been closed up to an angle smaller than the predetermined angle,
wherein
the controller
upon recognizing, after reading of the entire first face based on the first read instruction, that the document pressing portion is open at or wider than the predetermined angle based on the output of the first open/closed sensor before the second read instruction is given, makes the image reader perform reading without turning on the light source,
based on the second detection image data obtained by reading when the document pressing portion is open at or wider than the predetermined angle, calculates a fifth estimate size, which is an estimate value of the size of the second face in the main scanning direction,
when the operation panel accepts the second read instruction, makes the image reader perform reading with the position of the reading line set at the detection position and with the light source on,
based on the second detection image data obtained by reading when the operation panel accepts the second read instruction, calculates a sixth estimate size, which is an estimate value of the size of the second face in the main scanning direction, and
when, after reading of the entire first face based on the first read instruction, the document pressing portion is opened at or wider than the predetermined angle and then the document pressing portion is not even once closed up to an angle smaller than the predetermined angle before the second read instruction is given, determines the smaller of the fifth and sixth estimate sizes to be the second main scanning size.

8. The image reading device according to claim 7, further comprising a second open/closed sensor which senses the document pressing portion having been completely closed,
wherein
the controller
upon recognizing, after reading of the entire first face based on the first read instruction, that the document pressing portion is closed up to an angle smaller than the predetermined angle based on the output of the first open/closed sensor before the second read instruction is given, makes the image reader perform reading with the light source on,
based on the second detection image data obtained by reading when the document pressing portion is closed up to an angle smaller than the predetermined angle, calculates a seventh estimate size, which is an estimate value of the size of the second face in the main scanning direction, and
when the document pressing portion is closed up to an angle smaller than the predetermined angle and then the second read instruction is given with the document pressing portion not completely closed, determines the smaller of the fifth and seventh estimate sizes to be the second main scanning size.

9. The image reading device according to claim 8, wherein
the controller
upon recognizing, after reading of the entire first face based on the first read instruction, that the document pressing portion is completely closed based on the output of the second open/closed sensor before the second read instruction is given, makes the image reader perform reading with the light source on,
based on the second detection image data obtained by reading when the document pressing portion is completely closed, calculates an eighth estimate size, which is an estimate value of the size of the second face in the main scanning direction, and
determines the larger of the eighth estimate size and the smaller of the fifth and seventh estimate sizes to be the second main scanning size.

10. The image reading device according to claim 3, further comprising an output portion that performs output based on output image data,
wherein
the controller
when reading the entire first face based on the first read instruction, makes the image reader read a specific region on the document stage,
extracts first clipped image data from the first read image data obtained by reading the specific region,
when reading the entire second face based on the second read instruction, makes the image reader read the specific region,
extracts second clipped image data from the second read image data obtained by reading the specific region,
generates the output image data in which the first and second clipped image data are consolidated in one page, and
makes the output portion perform output based on the output image data,
a size of the first and second clipped image data in the sub scanning direction equals the determined definitive sub scanning size, and
a size of the first and second clipped image data in the main scanning direction equals the determined definitive main scanning size.

11. The image reading device according to claim 10, wherein
the controller
extracts from the first read image data the first clipped image data such that the first read image data includes a pixel corresponding to a reference point on the document stage, and
extracts from the second read image data the second clipped image data such that the second read image data includes the pixel corresponding to the reference point on the document stage, and
the reference point is, as seen from in front of the image reader, at a far left corner of the document stage.

12. A method for controlling an image reading device, comprising:
shining light from a light source toward a document stage on which a document to be read is placed;
performing reading using an image sensor based on the light from the light source;
making openable and closable a document pressing portion which includes a pressing plate for pressing the document placed on the document stage;
accepting selection of a reading mode;
generating image data based on an analog image signal output from the image sensor;
based on the generated image data, determining a size of the document placed on the document stage; and
when a double-side special mode for reading both sides of a special document is selected as the reading mode,
based on first read image data obtained by reading a first face, which is one side of the document, calculating a first sub scanning size, which is the size of the first face in a sub scanning direction,
based on second read image data obtained by reading the second face, which is another face of the document, calculating a second sub scanning size, which is the size of the second face in the sub scanning direction, and
determining the larger of the calculated first and second sub scanning sizes to be a definitive sub scanning size, which is the size of the document in the sub scanning direction set on the document stage.

* * * * *